United States Patent
Heddes et al.

(10) Patent No.: US 6,674,718 B1
(45) Date of Patent: Jan. 6, 2004

(54) UNIFIED METHOD AND SYSTEM FOR SCHEDULING AND DISCARDING PACKETS IN COMPUTER NETWORKS

(75) Inventors: Marco C. Heddes, Raleigh, NC (US); Clark Debs Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,280

(22) Filed: Apr. 11, 2000

(51) Int. Cl.[7] .............................................. G01R 31/08
(52) U.S. Cl. ....................... 370/230; 370/235; 370/412; 710/52
(58) Field of Search ............................. 370/230, 230.1, 370/232, 233, 234, 235, 235.1, 389, 412, 413, 414, 428, 429; 710/52, 56

(56) References Cited

U.S. PATENT DOCUMENTS

| | | | |
|---|---|---|---|
| 5,231,633 A | | 7/1993 | Hluchyj et al. |
| 5,268,900 A | | 12/1993 | Hluchyj et al. |
| 5,311,513 A | | 5/1994 | Ahmadi et al. |
| 5,359,592 A | | 10/1994 | Corbalis et al. |
| 5,367,523 A | | 11/1994 | Chang et al. |
| 5,748,629 A | * | 5/1998 | Caldara et al. ............. 370/389 |
| 5,790,522 A | | 8/1998 | Fichou et al. |
| 5,872,769 A | * | 2/1999 | Caldara et al. ............. 370/230 |
| 6,532,213 B1 | * | 3/2003 | Chiussi et al. ........... 370/230.1 |
| 6,570,883 B1 | * | 5/2003 | Wong .......................... 370/412 |

FOREIGN PATENT DOCUMENTS

| | | | | |
|---|---|---|---|---|
| EP | 847219 A2 | 6/1998 | | |
| JP | 11027279 | 6/1999 | | |
| WO | 9826628 | 6/1998 | ........... | H04Q/11/01 |

OTHER PUBLICATIONS

XP 000622960 "Analysis of Rate–Based Congestion Control Algorithms For ATM Networks. Part 2: Initial Transient State Analysis" Singapore, Nov. 14–16, 1995, New York, IEEE, US, Nov. 14, 1995,pp. 1095–1101, ISBN:0–7803–2510–9abstract.

XP002161812 BLUE: A New Class of Active Queue Management Algorithms Apr. 30, 1999 pp. 1, 5, 9, 15, 25.

International Search Report–PCT–Mar. 19, 2001.

* cited by examiner

*Primary Examiner*—Douglas Olms
*Assistant Examiner*—Bob A. Phunkulh
(74) *Attorney, Agent, or Firm*—Sawyer Law Group, LLP; Carlos Munoz-Bustamante

(57) ABSTRACT

A method and system for controlling pipes in a computer network is disclosed. The network includes processor(s) having a switch and a queue used for transmitting traffic through the switch. Minimum and maximum flows are set for each pipe. The queue level, any excess bandwidth and offered rate of packets are determined for the queue. A global transmit fraction is controlled using the queue level and offered rate so that the global transmit fraction and queue level are critically damped if the queue level is between certain levels. A transmit fraction for a flow is set to the minimum of the global and differential transmit fractions. The differential transmit fraction linearly increases the flow based on the minimum or maximum flow if excess bandwidth exists and the flow is less than the maximum and exponentially decreases the flow based on the minimum or maximum flow if excess bandwidth does not exist and the flow exceeds the minimum.

28 Claims, 13 Drawing Sheets

UNIFIED METHOD AND SYSTEM FOR SCHEDULING AND DISCARDING PACKETS IN COMPUTER NETWORKS

CROSS-REFERENCE TO RELATED APPLICATIONS

The present invention is related to U.S. patent application Ser. No. 09/448,197, filed on Nov. 23, 1999, entitled "METHOD AND SYSTEM FOR PROVIDING DIFFERENTIATED SERVICES IN COMPUTER NETWORKS" and assigned to the assignee of the present application. The present invention is also related to U.S. patent application Ser. No. 09/448,380, filed on Nov. 23, 1999, entitled "METHOD AND SYSTEM FOR CONTROLLING TRANSMISSION OF PACKETS IN COMPUTER NETWORKS" and assigned to the assignee of the present application. The present invention is also related to U.S. patent application Ser. No. 09/384,691, filed on Aug. 24, 1999, entitled "NETWORK PROCESSING COMPLEX AND METHODS" and assigned to the assignee of the present application. The present invention is also related to U.S. patent application Ser. No. 09/548,912, filed on Apr. 13, 2000 entitled "Network Processor Scheduler Using Unique Scheduling Structure".

FIELD OF THE INVENTION

The present invention relates to computer networks, and more particularly to a method and system for improving control over and resource allocation for a computer network, particularly a computer network capable of providing differentiated services.

BACKGROUND OF THE INVENTION

Driven by increasing usage of a variety of network applications, such as those involving the Internet, computer networks are of increasing interest. In order to couple portions of a network together or to couple networks, switches are often used. For example, FIG. 1A depicts a high-level block diagram of a switch 10 which can be used in a computer network. The switch 10 includes a switch fabric 3 coupled with blades 7, 8 and 9. Each blade 7, 8 and 9 is generally a circuit board and includes at least a network processor 2 coupled with ports 4. Thus, the ports 4 are coupled with hosts (not shown). The blades 7, 8 and 9 can provide traffic to the switch fabric 3 and accept traffic from the switch fabric 3. Thus, any host connected with one of the blades 7, 8 or 9 can communicate with another host connected to another blade 7, 8 or 9 or connected to the same blade.

FIG. 1B depicts a high-level block diagram of one embodiment of a network processor 2. The network processor 2 includes an ingress switch interface (ingress SWI) 11, an ingress enqueue/dequeue/scheduling logic (ingress EDS) 12, an embedded processor complex (EPC) 13, an ingress physical MAC, multiplexer (ingress PMM) 14, and egress physical MAC multiplexer (egress PMM) 15, an egress enqueue/dequeue/scheduling logic (egress EDS) 16 and an egress switch interface (egress SWI) 17. The network processor 2 may also contain other storage and processing devices. The ingress SWI 11 and egress SWI 17 are coupled with the switch fabric 24 (depicted in FIG. 1A) for the switch 10. Referring back to FIG. 1B, the EPC 13 includes a number of protocol processors plus co-processors. The ingress EDS 12 and egress EDS 16 can perform certain enqueuing, dequeuing and scheduling functions for traffic traveling from devices, such as Ethernet devices, to the switch fabric and for traffic traveling from the switch fabric to the devices, respectively. The ingress SWI 11 and egress SWI 17 provide links for connecting to other devices, such as another network processor or switch (not shown in FIG. 1B). The ingress PMM 14 and egress PMM 15 receive traffic from and transmit traffic to, respectively, physical layer devices.

FIG. 2A depicts another simplified block diagram of the switch 10, illustrating some of the functions performed by network processors 2. Although some of the functions are performed by the same components as shown in FIG. 1A, these components may be labeled differently. For example, for the purposes of explaining the path of traffic through the switch 10, the switch fabric 3 of FIG. 1A is depicted as switch fabric 26 in FIG. 2A. The switch 10 couples hosts (not shown) connected with ports A 18 with those hosts (not shown) connected with ports B 36. Thus, the switch 10 allows packets of data to be transferred from the source to the destination. Data packets could include a number of different types of data packets. For example, Ethernet packets (usually termed frames), ATM packets (usually termed cells) and IP packets (usually termed packets) will all be packets herein. The switch 10 performs various functions including classification of data packets provided to the switch 10, transmission of data packets across the switch 10 and reassembly of packets. These functions are provided by the classifier 22, the switch fabric 26 and the reassembler 30, respectively. The classifier 22 classifies packets which are provided to it and breaks each packet up into convenient-sized portions, which will be termed cells. The switch fabric 26 is a matrix of connections through which the cells are transmitted on their way through the switch 10. The reassembler 30 reassembles the cells into the appropriate packets. The packets can then be provided to the appropriate port of the ports B 36, and output to the destination hosts. The classifier 19 may be part of one network processor 1, while the reassembler 30 may be part of another network processor 5. The portions of the network processor 1 and the network processor 5 depicted perform functions for traffic traveling from ports A 18 and to ports B 36, respectively. However, the network processors 1 and 5 also perform functions for traffic traveling from ports B 36 and to ports A 18, respectively. Thus, each network processor 1 and 5 can perform classification and reassembly functions. Furthermore, each network processor 1 and 5 can be a network processor 2 shown in FIGS. 1A and 1B.

Referring back to FIG. 2A, due to bottlenecks in transferring traffic across the switch 10, data packets may be required to wait prior to execution of the classification, transmission and reassembly functions. As a result, queues 20, 24, 28 and 34 may be provided. Coupled to the queues 20, 24, 28 and 34 are enqueuing mechanisms 19, 23, 27 and 32. The enqueuing mechanisms 19, 23, 27 and 32 place the packets into the corresponding queues 20, 24, 28 and 34 and can provide a notification which is sent back to the host from which the packet originated. The classification, enqueuing, and scheduling functions are preferably provided by the ingress EDS 12 and egress EDS 16 in the network processor depicted in FIG. 1B. Referring to FIGS. 1B and 2A, the enqueuing mechanisms 19 and 23, the queues 20 and 24, the classifier 22 and the schedulers 21 and 25 are controlled using the ingress EDS 12. Similarly, the enqueuing mechanisms 27 and 32, the queues 28 and 34, the reassembler 30 and the schedulers 29 and 35 are controlled using the egress EDS 16.

Also depicted in FIG. 2A are schedulers 21, 25, 29 and 35. The schedulers control the scheduling of individual packets which are to leave the queues 20, 24, 28 and 34, respectively. In general, the concern of the present application is the egress portion of the network processor 2, depicted by egress PMM 15, egress EDS 16 and egress SWI 17 in FIG. 1B. Thus, referring back to FIG. 2A, one focus of the present invention includes the scheduler 35 which controls the traffic to ports B 36. Consequently, for clarity, the function of schedulers is discussed with regard to the scheduler 35 and the queue 34. Typically, the scheduler 35 is provided with information relating to each packet in the queue 34. This information may include the type of the packet, such as a real-time packet for which time of transmission is important, or a data packet for which the speed of transmission is not important. Based on this information and other information provided to it, the scheduler 35 determines each individual packet in the queue 34 will be removed from the queue and sent on towards its destination. For example, the scheduler 35 may include one or more calendars (not shown), each including a number of positions, and a weighted fair queuing ring (not shown) including another number of positions. The scheduler 35 may place certain packets in the calendar and other packets in the ring. The scheduler allocates a certain amount of time to each position in the calendar. Each position in the calendar can have a single packet, typically represented by an identifier, or can be empty. When the scheduler reaches a certain position, a packet placed at that position will be retrieved from the queue and sent toward its destination. If, however, the position in the calendar is empty, the scheduler 35 waits until a particular amount of time has passed, then moves to the next position in the calendar. Similarly, the scheduler 35 places other packets in positions of the weighted fair queuing ring of the scheduler 35. A position in the weighted fair queuing ring can also be either occupied by a single packet or empty. If the position is occupied, then the scheduler 35 sends the packet in the position upon reaching the position. If the position is unoccupied, the scheduler 35 skips to the next occupied position Thus, using the scheduler 35 to control individual packets leaving the queue 34, traffic can flow through the switch 10.

Although the queues 20, 24, 28 and 34 are depicted separately, one of ordinary skill in the art will readily realize that some or all of the queues 20, 24, 28 and 34 may be part of the same physical memory resource. FIG. 2B depicts one such switch 10'. Many of the components of the switch 10' are analogous to components of the switch 10. Such components are, therefore, labeled similarly. For example, the ports A 18' in the switch 10' correspond to the ports A 18 in the switch 10. In the switch 10', the queue A 19 and the queue B 24 share a single memory resource 31. Similarly, the queue C 28 and the queue D 34 are part of another single memory resource 33. Thus, in the switch 10', the queues 20, 24, 28 and 34 are logical queues partitioned from the memory resources 32 and 33.

Currently, most conventional switches 10 have only two mechanisms for controlling the flow of traffic through the switch 10. One conventional method for controlling the flow of traffic through the switch 10 attempts to ensure that the memory relevant memory resource, such as the queue 16, is not overloaded. This conventional method is known as RED (random early discard or detection). FIG. 3 depicts the conventional method 40 used in RED. The conventional method 40 is typically used by one of the enqueuing mechanisms 19, 23, 27, 32, 19', 23', 27' and 32' to control the traffic through the corresponding queue 20, 24, 28, 34, 20', 24', 28' and 34' respectively. For the purposes of clarity, the method 40 will be explained with reference to the enqueuing mechanism 32 and the queue 34.

At the end of a short period of time, known as an epoch, a queue level of the queue 34 for the epoch is determined by the enqueuing mechanism 32, via step 41. Note that the queue level determined could be an average queue level for the epoch. In addition, the queue level determined could be the total level for the memory resource of which the queue 34 is a part. It is then determined if the queue level is above a minimum threshold, via step 42. If the queue level is not above the minimum threshold, then a conventional transmit fraction is set to one, via step 43. Step 43, therefore, also sets the conventional discard fraction to be zero. The transmit fraction determines the fraction of packets that will be transmitted in the next epoch. The conventional discard fraction determines the fraction of packets that will be dropped. The conventional discard fraction is, therefore, equal to one minus the conventional transmit fraction. A transmit fraction of one thus indicates that all packets should be transmitted and none should be dropped.

If it is determined in step 42 that the queue level is above the minimum threshold, then it is determined whether the queue level for the epoch is above a maximum threshold, via step 44. If the queue level is above the maximum threshold, then the conventional transmit fraction is set to zero and the conventional discard fraction set to one, via step 45. If the queue level is not above the maximum threshold, then the conventional discard fraction is set to be proportional to the queue level of the previous epoch divided by a maximum possible queue level or, alternatively, to some other linear function of the queue level, via step 46. Thus, the conventional discard fraction is proportional to the fraction of the queue 34 that is occupied or some other linear function of the queue level. In step 46, therefore, the conventional transmission is also set to be proportional to one minus the conventional discard fraction. The conventional transmit fraction and the conventional discard fraction set in step 43, 45 or 46 are then utilized for the next epoch to randomly discard packets, via step 47. Thus, when the queue level is below the minimum threshold, all packets will be transmitted by the enqueuing mechanism 32 to the queue 34 during the next epoch. When the queue level is above a maximum threshold, then all packets will be discarded by the enqueuing mechanism 32 during the next epoch or enqueued to a discard queue. When the queue level is between the minimum threshold and the maximum threshold, then the fraction of packets discarded by the enqueuing mechanism 32 is proportional to the fraction of the queue 34 that is occupied or some other linear function of the queue level. Thus, the higher the queue level, the higher the fraction of packets discarded. In addition, a notification may be provided to the sender of discarded packets, which causes the sender to suspend sending additional packets for a period of time. The individual packets which are selected for discarding may also be randomly selected. For example, for each packet, the enqueuing mechanism 32 may generated a random number between zero and one. The random number is compared to the conventional discard fraction. If the random number is less than or equal to the conventional discard fraction, then the packet is dropped. Otherwise, the packet is transmitted to the queue 34. This process of discarding packets based on the transmit fraction is continued until it is determined that the epoch has ended, via step 48. When the epoch ends, the method 40 commences again in step 41 to determine the conventional transmit fraction for the next epoch and drop packets in accordance with the conventional transmit fraction during the next epoch.

Because packets can be discarded based on the queue level, the method 40 allows some control over the traffic through the switch 10 or 10'. As a result, fewer packets may be dropped due to droptail than in a switch which does not have any mechanism for discarding packets before the queue 34 becomes full. Droptail occurs when packets must be dropped because a queue is full. As a result, there is no opportunity to account for the packet's priority in determining whether to drop the packet. Furthermore, in some situations, the method 40 can reduce the synchronization of hosts sending packets to the switch 10 or 10'. This occurs because packets may be dropped randomly, based on the conventional transmit fraction, rather than dropping all packets when the queue level is at or near the maximum queue level. Performance of the switch 10 and 10' is thus improved over a switch that does not utilize RED, that is, a switch that simply drops next arriving packets when its buffer resources are depleted.

Although the method 40 improves the operation of the switches 10 and 10', one of ordinary skill in the art will readily realize that in many situations, the method 40 fails to adequately control traffic through the switch 10 or 10'. Despite the fact that packets, or cells, may be dropped before the queue becomes full, the hosts tend to become synchronized in some situations. This is particularly true for moderate or higher levels of congestion of traffic in the switch 10 or 10'. The conventional transmit fraction is based on the queue level. However, the queue level may not be indicative of the state of the switch. For example, a queue level below the minimum threshold could be due to a low level of traffic in the switch 10 or 10' (a low number of packets passing through the switch 10 or 10'). However, a low queue level could also be due to a large number of discards in the previous epoch because of high traffic through the switch 10. If the low queue level is due to a low traffic level, increasing the conventional transmit fraction is appropriate. If the low queue level is due to a high discard fraction, increasing the conventional transmit fraction may be undesirable. The conventional method 40 does not distinguish between these situations. As a result, the conventional transmit fraction may be increased when it should not be. When this occurs, the queue may become rapidly filled. The transmit fraction will then be dropped, and the queue level will decrease. When the queue level decreases the transmit fraction will increase, and the queue may become filled again. The switch 10 or 10' thus begins to oscillate between having queues full and queues empty. As a result, the average usage of the switch 10 or 10' becomes quite low and the performance of the network using the switch 10 or 10' suffers.

A second conventional method for controlling traffic across the switch is used to provide customers with different services based, for example, on the price paid by a consumer for service. A consumer may wish to pay more to ensure a faster response or to ensure that the traffic for the customer will be transmitted even when traffic for other customers is dropped due to congestion. Thus, the concept of differentiated services has been developed. Differentiated services can provide different levels of service, or flows of traffic through the network, for different customers.

DiffServ is an emerging Internet Engineering Task Force (IETF) standard for providing differentiated services (see IETF RFC 2475 and related RFCs). DiffServ is based on behavior aggregate flows. A behavior aggregate flow can be viewed as a pipeline from one edge of the network to another edge of the network. Within each behavior aggregate flow, there could be hundreds of sessions between individual hosts. However, DiffServ is unconcerned with sessions within a behavior aggregate flow. Instead, DiffServ is concerned with allocation of bandwidth between the behavior aggregate flows. According to DiffServ, excess bandwidth is to be allocated fairly between behavior aggregate flows. Furthermore, Differv provides criteria, discussed below, for measuring the level of service provided to each behavior aggregate flow.

One conventional mechanism for providing different levels of services utilizes a combination of weights and a queue level to provide different levels of services. FIG. 4 depicts such a conventional method 50. The queue level thresholds and weights are set, via step 52. Typically, the queue level thresholds are set in step 52 by a network administrator turning knobs. The weights can be set for different pipes, or flows, through a particular queue, switch 10 or network processor 1 or 5. Thus, the weights are typically set for different behavior aggregate flows. The instantaneous queue levels, averaged queue levels, instantaneous pipe flow rates, or averaged pipe flow rates are observed, typically at the end of a period of time known as an epoch, via step 54. The flows for the pipes are then changed based on how the queue level compares to the queue level threshold and on the weights, via step 56. Flows for pipes having a higher weight undergo a greater change in step 56. The queue value or pipe flow rate for a pipe determines what fraction of traffic offered to a queue, such as the queue 34, by the pipe will be transmitted to the queue 34 by the corresponding enqueuing mechanism, such as the enqueuing mechanism 32. Traffic is thus transmitted to the queue or dropped based on the flows, via step 58. A network administrator then determines whether the desired levels of service are being met, via step 60. If so, the network administrator has completed his or her task. However, if the desired level of service is not achieved, then the queue level or pipe flow level thresholds and, possibly, the weights are reset, via step 52 and the method 50 repeats.

Although the method 50 functions, one of ordinary skill in the art will readily realize that it is difficult to determine what effect changing the queue level thresholds will have on particular pipes through the network. Thus, the network administrator using the method 50 may have to engage in a great deal of experimentation before reaching the desired flow rate for different customers, or pipes (behavior aggregate flows) in a computer.

Furthermore, the method 50 indirectly operates on parameters that are typically use to measure the quality of service. Queue levels are not a direct measure of criteria typically used for service. Typically, for example in DiffServ (see IETF RFC 2475 and related RFCs), levels of service are measured by four parameters: drop rate, bandwidth, latency and jitter. The drop rate is the percentage of traffic that is dropped as it flows across a switch. The bandwidth of a behavior aggregate flow is a measure of the amount of traffic for the behavior aggregate flow which crosses the switch and reaches its destination. Latency is the delay incurred in sending traffic across the network. Jitter is the variation of latency with time. The queue levels are not considered to be a direct measure of quality of service. Thus, the method 50 does not directly address any of the criteria for quality of service. Thus, it is more difficult for a network administrator to utilize the method 50 for providing different levels of service.

Another conventional method for controlling traffic utilizes flows, minimum flows rates, weights, priorities, thresholds and a signal indicating that excess bandwidth, or ability to transmit traffic, exists in order to control flows. However, it is not clear that this conventional method is a stable mechanism for controlling traffic through the switch. Consequently, this conventional method may not adequately control traffic through the as switch 10.

Moreover, even when using the method 40 depicted in FIG. 3 (conventional RED) and the method 50 depicted in FIG. 4, a scheduler such as the scheduler 35 may be provided with a larger amount of work than can be accomplished in a given time. In particular, if too many packets are desired to be removed from the queue 34 in a particular amount of time, the scheduler may be unable to cope with the traffic through the switch 10. For example, the scheduler 35 may be capable of ensuring that packets removed from the queue 34 are forwarded toward their final destination, such as a target port, at a first rate. The first rate may be limited by a variety of factors, such as the ability of the target port to accept traffic. The method 40 and the method 50 may allow packets to be removed from the queue at a second rate. If the second rate is larger than the first rate, then packets begin to back up in the scheduler 35. For example, if the scheduler 35 includes a calendar and a weighted fair queuing ring, then all of the positions in the calendar and the weighted fair queuing ring can eventually become occupied. The packets will thus be stalled from leaving the queue 34 until a position in the calendar or the weighted fair queuing ring in the scheduler 35 becomes open. As a result, the latency for packets traveling through the switch 10 will increase. Traffic will thus be slowed. Consequently, the switch 10 will not function as efficiently as desired.

Accordingly, what is needed is a system and method for improving the efficiency of a switch while providing differentiated services. The present invention addresses such a need.

SUMMARY OF THE INVENTION

The present invention provides a method and system for controlling a plurality of pipes in a computer network. The computer network includes at least one processor and a switch. The at least one processor includes a queue. The plurality of pipes use the queue for transmitting traffic through the switch. The method and system comprise allowing a minimum flow and a maximum flow to be set for each of the plurality of pipes. The method and system also comprise determining if excess bandwidth exists for the queue, a queue level for the queue, and an offered rate of the plurality of packets to the queue. The method and system also comprise controlling a global transmit fraction of the plurality of packets to the queue. The global transmit fraction is controlled based on the queue level and the offered rate so that the transmit fraction and the queue level are critically damped if the queue level is between at least a first queue level and a second queue level. The method and system also comprise setting a transmit fraction for a flow for a pipe of the plurality of pipes to be a minimum of the global transmit fraction and a differential transmit fraction. The differential transmit fraction can linearly increase the flow based on the minimum flow or the maximum flow if excess bandwidth exists and if the flow for the pipe is less than the maximum flow. The differential transmit fraction can also exponentially decrease the flow for the pipe based on the minimum flow or the maximum flow if excess bandwidth does not exist and the flow is greater than the minimum flow. Thus traffic through the queue is stable. The method and system also comprise controlling transmission of traffic to the queue based on the transmit fraction and utilizing a scheduler to control traffic from the queue. The scheduler can therefore send frames in various pipes according to the policies an administrator specifies. During a time of oversubscription, the upstream flow control will react first with per pipe per port discards to restrain the workload sent to the scheduler to a feasible workload. Thus, the differential transmit fraction can aid in controlling the workload sent to the scheduler. In the even of a large surge of traffic, the portion of flow control which reacts to the shared memory depletion might also help to keep the workload feasible by declaring a generic transmit rate for the entire blade at a value less than one. In other words, the global transmit fraction may also aid in controlling the workload sent to the scheduler.

According to the system and method disclosed herein, the present invention provides an improved mechanism for controlling traffic through a switch using a scheduler while providing differentiated services.

DETAILED DESCRIPTION OF THE INVENTION

The present invention relates to an improvement in control of traffic in computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Currently, it is desirable to control traffic through a switch to avoid exhausting a resource, such as the queue, and to provide differentiated services can be provided. In addition, it may be desirable to use a scheduler to control traffic through the switch at a finer level by controlling the removal of individual packets from a queue in the switch. Current conventional methods of providing differentiated service and current conventional methods of controlling traffic through the switch using the queue (RED) may not be capable of adequately controlling the switch. In addition, these conventional methods may still present the scheduler with such a large volume of work to complete that the scheduler is unable to function without adding a significant latency to the transmission time of a packet through the switch. Consequently, better mechanisms for controlling traffic through a switch are still desired.

Figure 5:
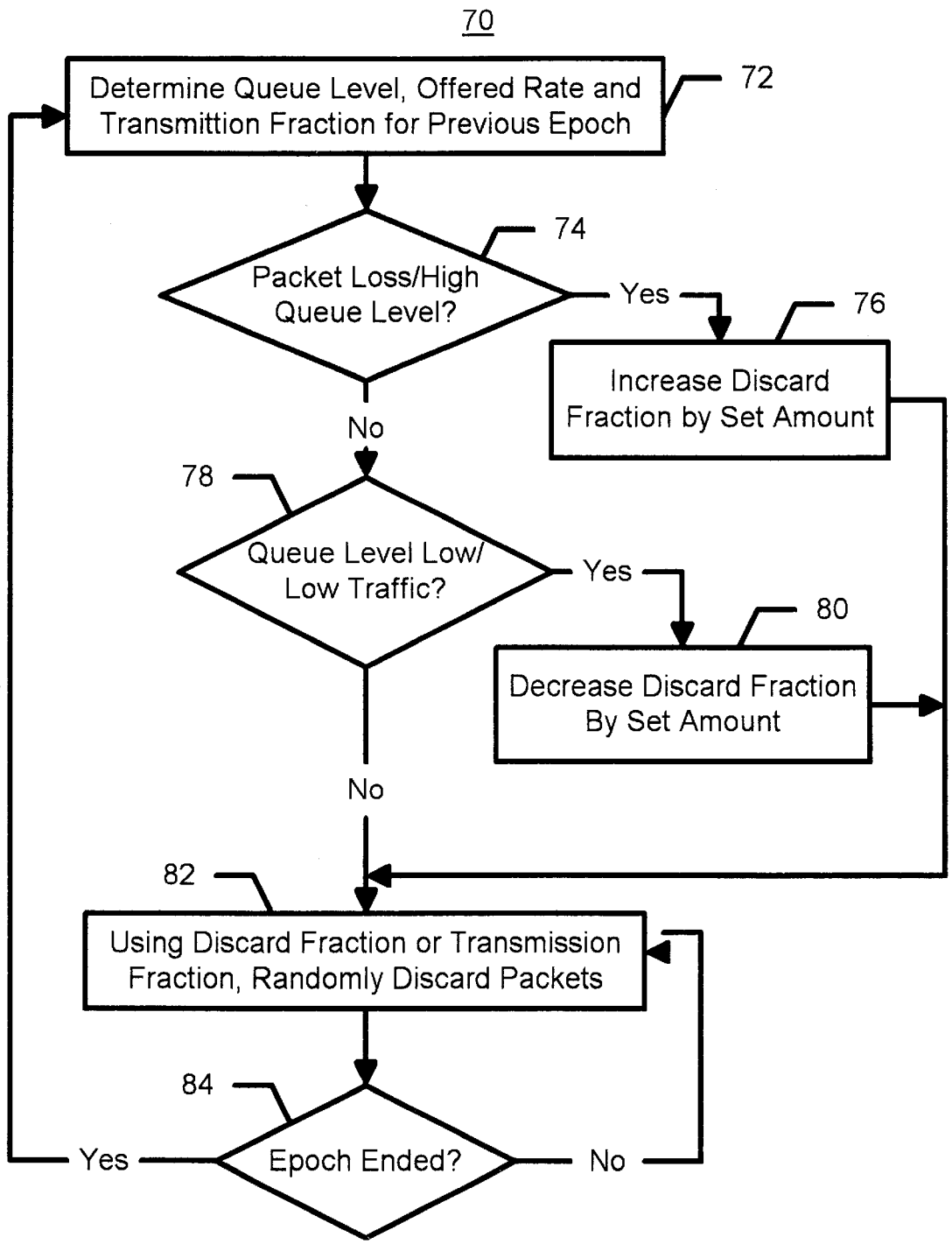
FIG. 5 is a flow chart depicting a more recent conventional method for using resource levels to control traffic through a switch.

More recently, another method has been developed for controlling traffic through a switch. FIG. 5 depicts a flow chart of a more recent method 70 developed by other individuals of International Business Machines, Inc. of Armonk, N.Y. This method 70 is known as BLUE. The method 70 takes into account not only the queue level, but also the transmission rate and the offered rate. The offered rate is the rate at which packets or cells are offered to the enqueuing mechanism to be provided to the corresponding queue. The method 70 will be described using the enqueuing mechanism 32 and the queue 34. The queue level for the queue 34, the transmit fraction provided to the queue 34 by the enqueuing mechanism 32 and offered rate are determined for an epoch which just ended, via step 72. An epoch is a period of time over which traffic is observed in order to control traffic during a next epoch. The offered rate is the rate at which packets are provided to the enqueuing mechanism 32. Thus, the offered rate could come from flows of traffic provided by one or more of the ports A 18.

It is then determined whether there is a packet loss or a queue level greater than some threshold, via step 74. Either event indicates that the discard fraction should be increased, reducing the number of packets flowing to the queue 34. If so, then the discard fraction is incremented by a first constant amount that may be empirically determined, via step 76. Thus, in step 76 the transmit fraction, which is one minus the discard fraction, is decreased. If it is determined in step 74 that the discard fraction should not be increased, then it is determined whether the discard fraction should be decreased, via step 78. The discard fraction should be decreased if the queue level is low or the offered rate is low. If the discard fraction should be decreased, then this is accomplished by subtracting a second constant amount that may also be empirically determined, via step 80. The discard fraction determined in step 76 or 78, if changed, or the old discard fraction is then used to determine the fraction of packets to be transmitted to the queue 34 during the next epoch, via step 82. Thus, in step 82 the packets may be discarded randomly or by also taking into account the each packet's priority. It is thus ensured that the correct discard fraction and, therefore, the correct transmit fraction are maintained. It is then determined whether the epoch has ended, via step 84. If so, step 72 is returned to. Otherwise, the method 70 repeats commencing at step 84. For further details on BLUE, the website http://www.eecs.umich.edu/usuchang/blue/ can be consulted.

Although the method 70 (BLUE) works well for its intended purpose and is an improvement over the conventional method 50 (RED), one of ordinary skill in the art will readily realize that the method 70 may take a relatively long time to reach a stable state. Furthermore, the method 70 may still present a scheduler 35 with too large a volume of work to accomplish. Thus, although performance is improved over the conventional method 50, performance of the network may still be poorer than what is desired.

The present invention provides a method and system for controlling a plurality of pipes in a computer network. The computer network includes at least one processor and a switch. The at least one processor includes a queue. The plurality of pipes use the queue for transmitting traffic through the switch. The method and system comprise allowing a minimum flow and a maximum flow to be set for each of the plurality of pipes. The method and system also comprise determining if excess bandwidth exists for the queue, a queue level for the queue, and an offered rate of the plurality of packets to the queue. The method and system also comprise controlling a global transmit fraction of the plurality of packets to the queue. The global transmit fraction is controlled based on the queue level and the offered rate so that the transmit fraction and the queue level are critically damped if the queue level is between at least a first queue level and a second queue level. The method and system also comprise setting a transmit fraction for a flow for a pipe of the plurality of pipes to be a minimum of the global transmit fraction and a differential transmit fraction. The differential transmit fraction can linearly increase the flow based on the minimum flow or the maximum flow if excess bandwidth exists and if the flow for the pipe is less than the maximum flow set for the pipe. The differential transmit fraction can also exponentially decrease the flow for the pipe based on the minimum flow or the maximum flow if excess bandwidth does not exist and the flow is greater than the minimum flow set for the pipe. Thus traffic through the queue is stable. The method and system also comprise controlling transmission of traffic to the queue based on the transmit fraction and utilizing a scheduler to control traffic from the queue. The scheduler might enable one policy or a combination of policies. For example, the scheduler might utilize one or a combination of the following policies: First In First Out, Priority Queuing, Custom Queuing, Weighted Fair Queuing, Class Based Weighted Fair Queuing, Versatile Interface Processor Weighted Fair Queuing, Round Robin, Weighted Round Robin, or other known queuing policies.

The present invention will be described in terms of a particular system and particular components. However, one of ordinary skill in the art will readily recognize that this method and system will operate effectively for other components in a computer network. The present invention will also be described in the context of a queue. However, one of ordinary skill in the art will readily recognize that the present invention functions effectively when queues are logical queues part of a single memory resource or when the queues are part of separate memory resources. Furthermore, the present invention functions analogously when controlling flows into a subqueue of a particular logical queue. The present invention will also be discussed in terms of controlling network flows by proactively discarding packets. However, one of ordinary skill in the art will readily realize that the method and system control the rate of packets arriving in a queue and that a signal sent to a source and dictating a fraction of packets to be sent, with others held at the source, would be effective. Therefore, control of a transmit fraction is analogous control of a rate at which packets are offered, for example by one or more sources. Furthermore, the present invention will be described in terms of pipes, or flows provided, to a queue. However, one of ordinary skill in the art will readily realize that the pipes could be behavior aggregate flows of different or the same class or any offered rate into a particular component which utilizes a queue for storage.

To more particularly illustrate the method and system in accordance with the present invention, refer now to FIGS.

Figure 1A:
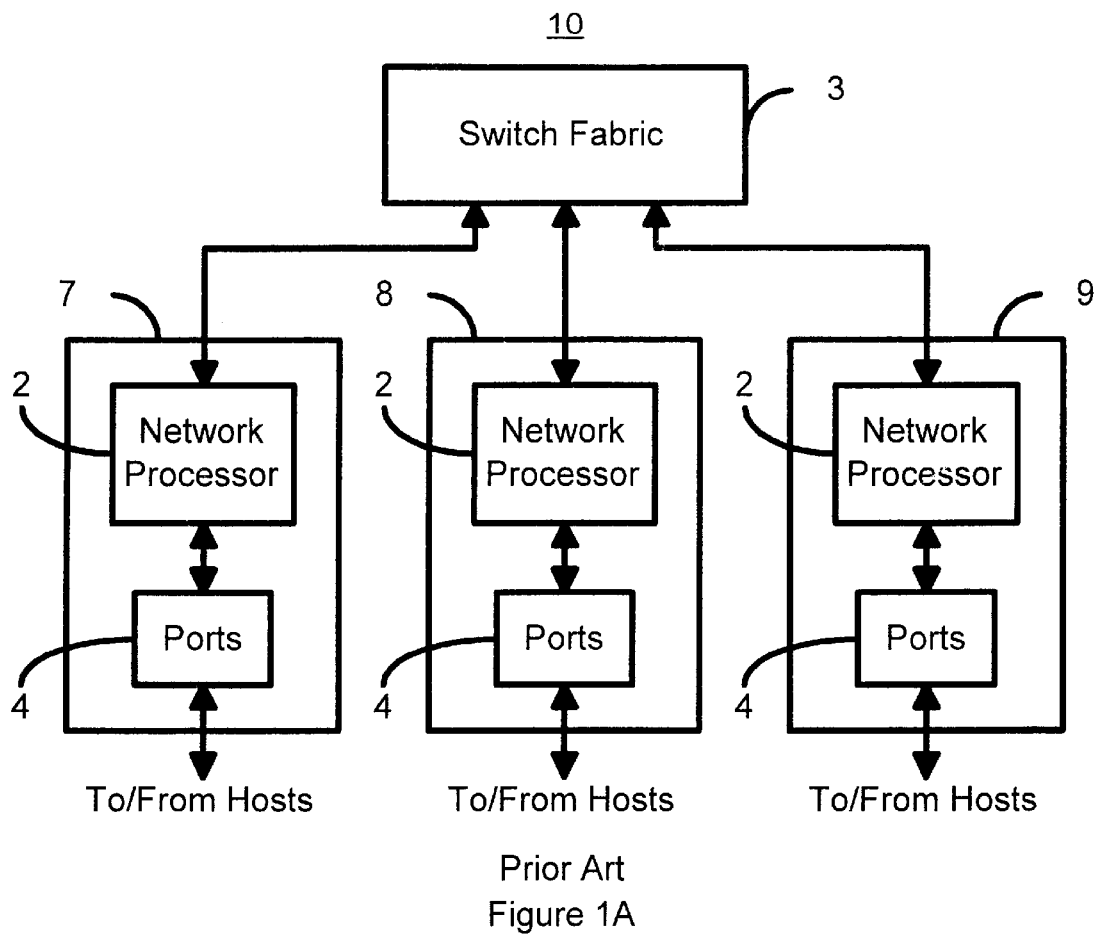
FIG. 1A is a high-level block diagram of a switch.
Figure 1B:
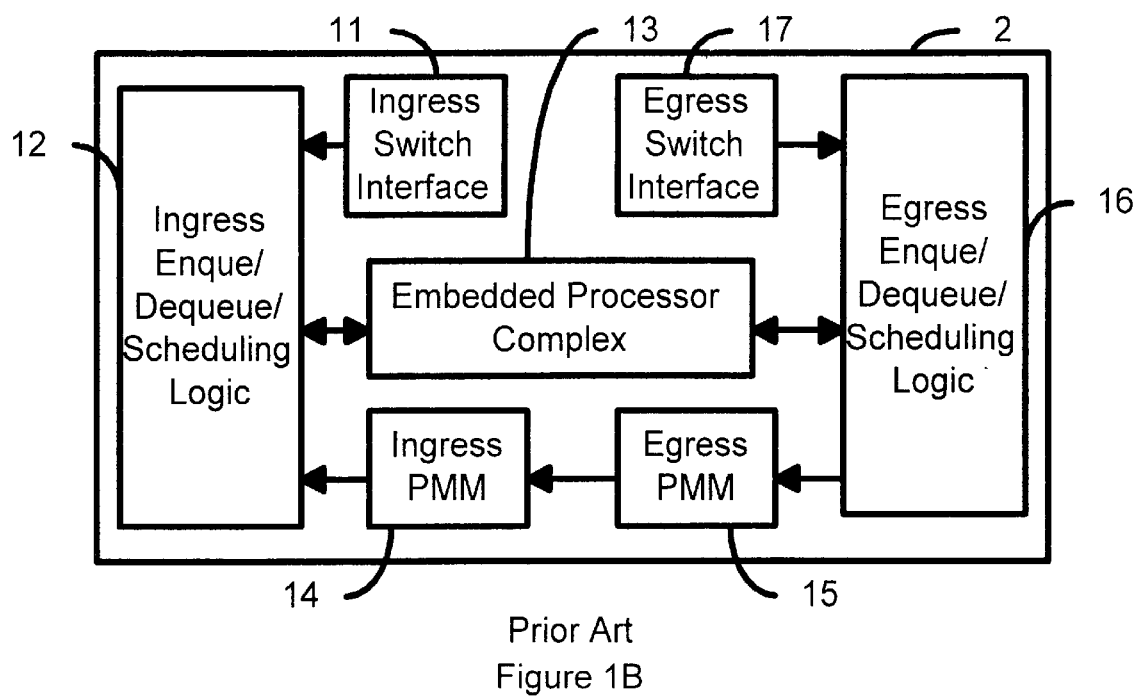
FIG. 1B is a high-level block diagram of a network processor residing in the switch.

6A and 6B, depicting one embodiment of a method 100 in accordance with the present invention. The method 100 is preferably accomplished using the apparatus disclosed in U.S. patent application Ser. No. 09/384,691, filed on Aug. 27, 1999, entitled "NETWORK PROCESSING COMPLEX AND METHODS" and assigned to the assignee of the present application. Applicants hereby incorporate by reference the above-mentioned co-pending U.S. Patent Application. The method 100 can be used with the switch 10 or 10' shown in FIGS. 1, 2A and 2B. Thus, the method 100 can be carried out in a switch 10 having multiple blades 7, 8 and 9 and multiple ports on each blade 7, 8 or 9. For the purposes of clarity, the method 100 will be explained in conjunction with the queue 34 and enqueuing mechanism 32 depicted in FIG. 2A. In a preferred embodiment, the method 100 is used on the egress side of the switch 10 and, therefore, the egress portion of the network processor 2. Thus, the method 100 is preferably used with the enqueuing mechanisms 32 and 32', the queues 34 and 34' and the schedulers 35 and 35'. However, nothing prevents the method 100 from being used with other queues, such as the queues 20, 24, 28, 20', 24', 28' and 34', other enqueuing mechanisms, such as the enqueuing mechanisms 19, 23, 27, 19', 22', 27' and 32', and other schedulers. In a preferred embodiment, the method 100 is used in a system in which multiple queues are part of the same memory resource. However, nothing prevents the method 100 from being used in another system in which each queue has a separate memory resource.

Figure 2A:
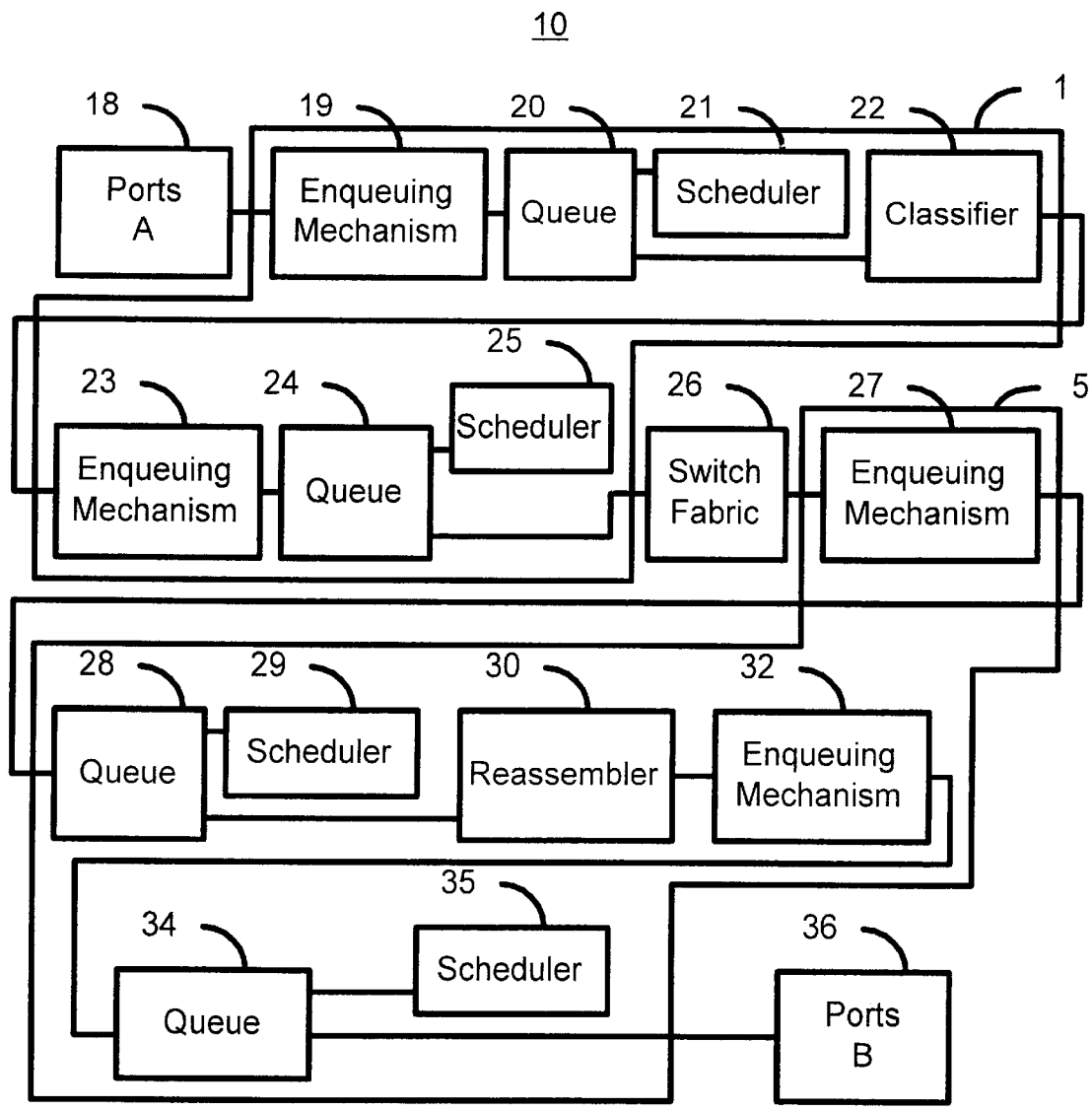
FIG. 2A is a simplified block diagram of a switch.
Figure 2B:
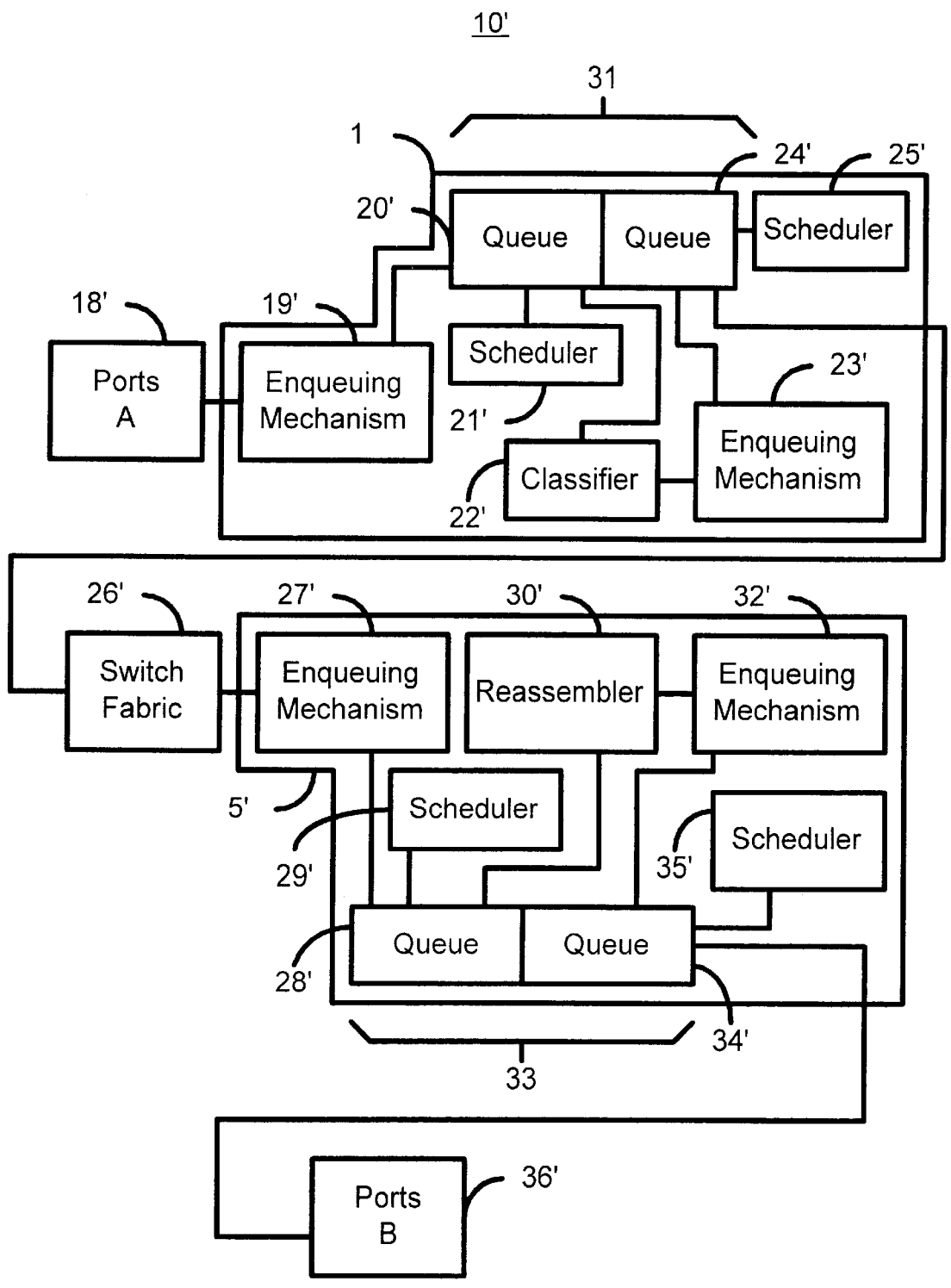
FIG. 2B is a simplified block diagram of another switch.
Figure 3:
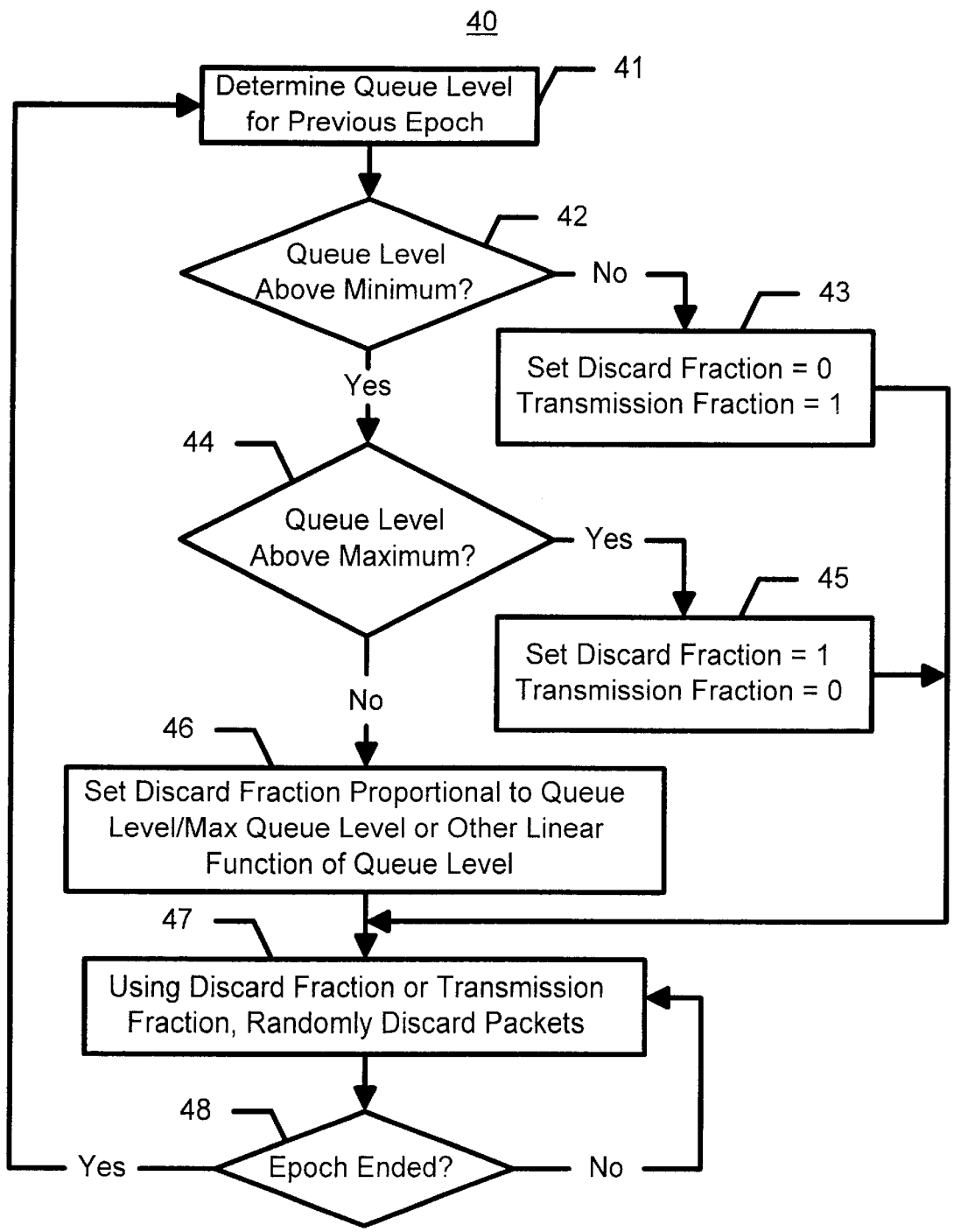
FIG. 3 is a flow chart depicting a conventional method for using resource levels to control traffic through a switch using conventional RED (random early discard).
Figure 4:
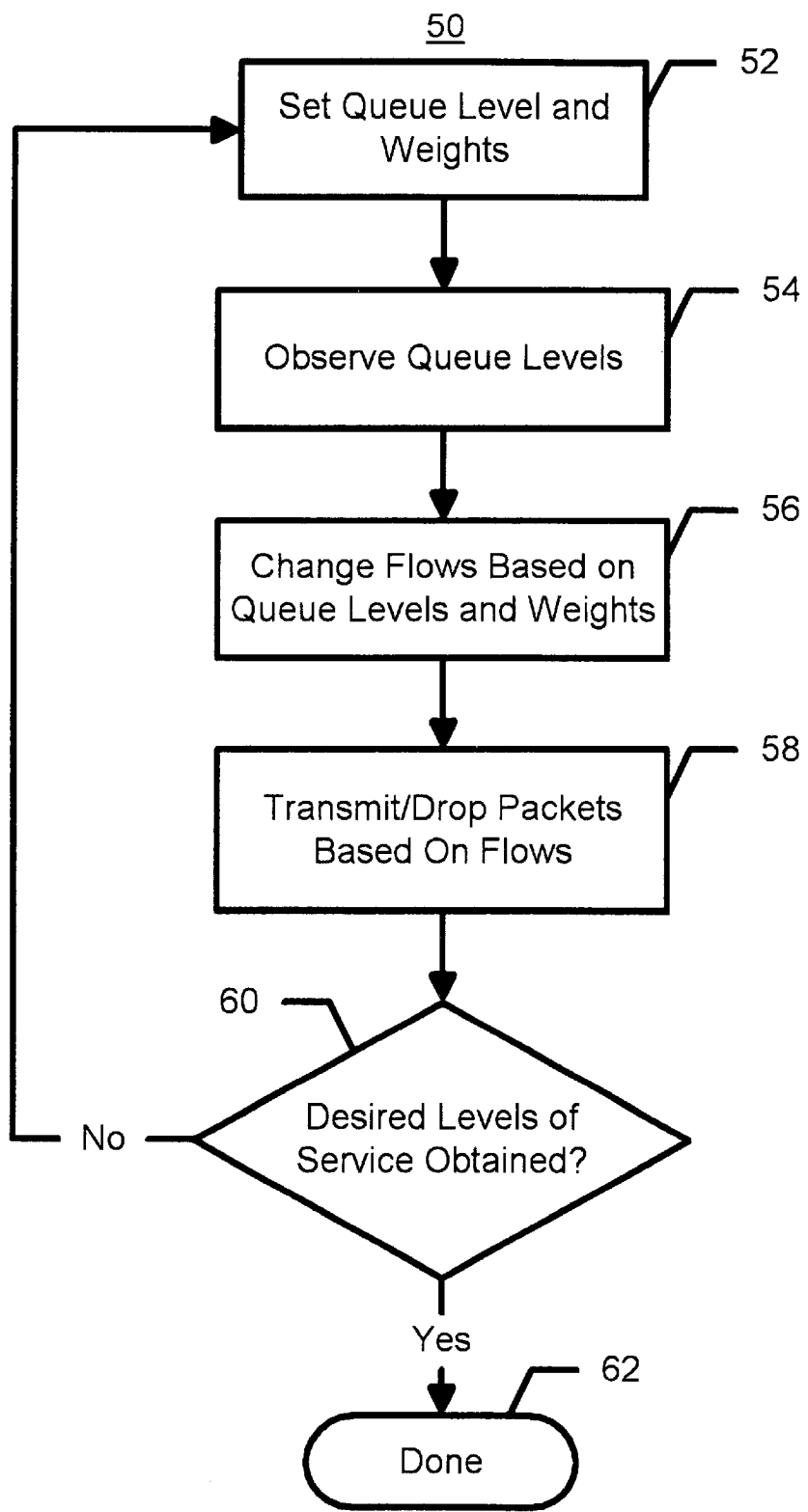
FIG. 4 is a flow chart depicting a conventional method for providing different levels of service through a switch.
Figure 6A:
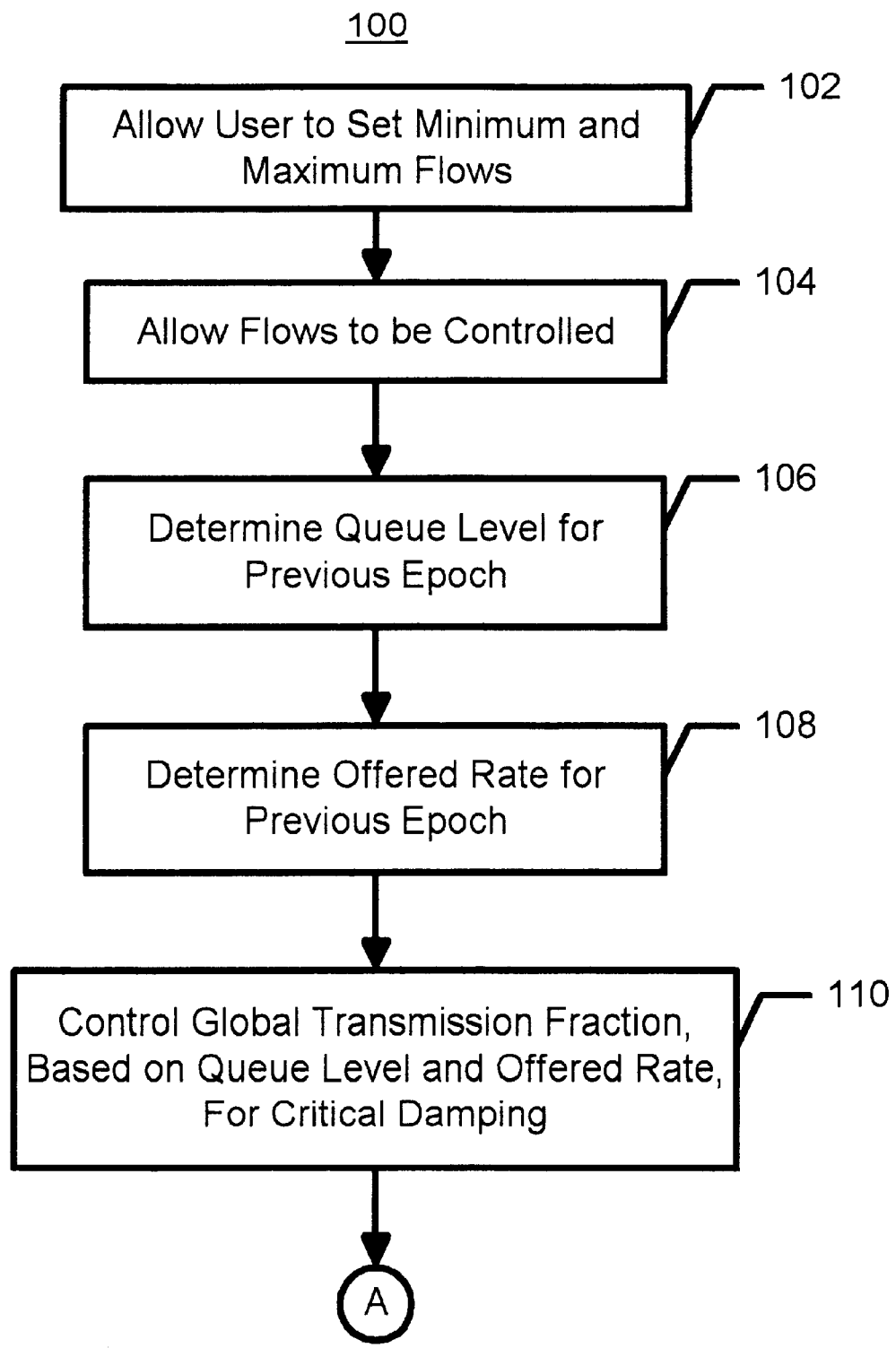
FIGS. 6A and 6B depict a flow chart of one embodiment of a method in accordance with the present invention for controlling traffic through a switch.
Figure 6B:
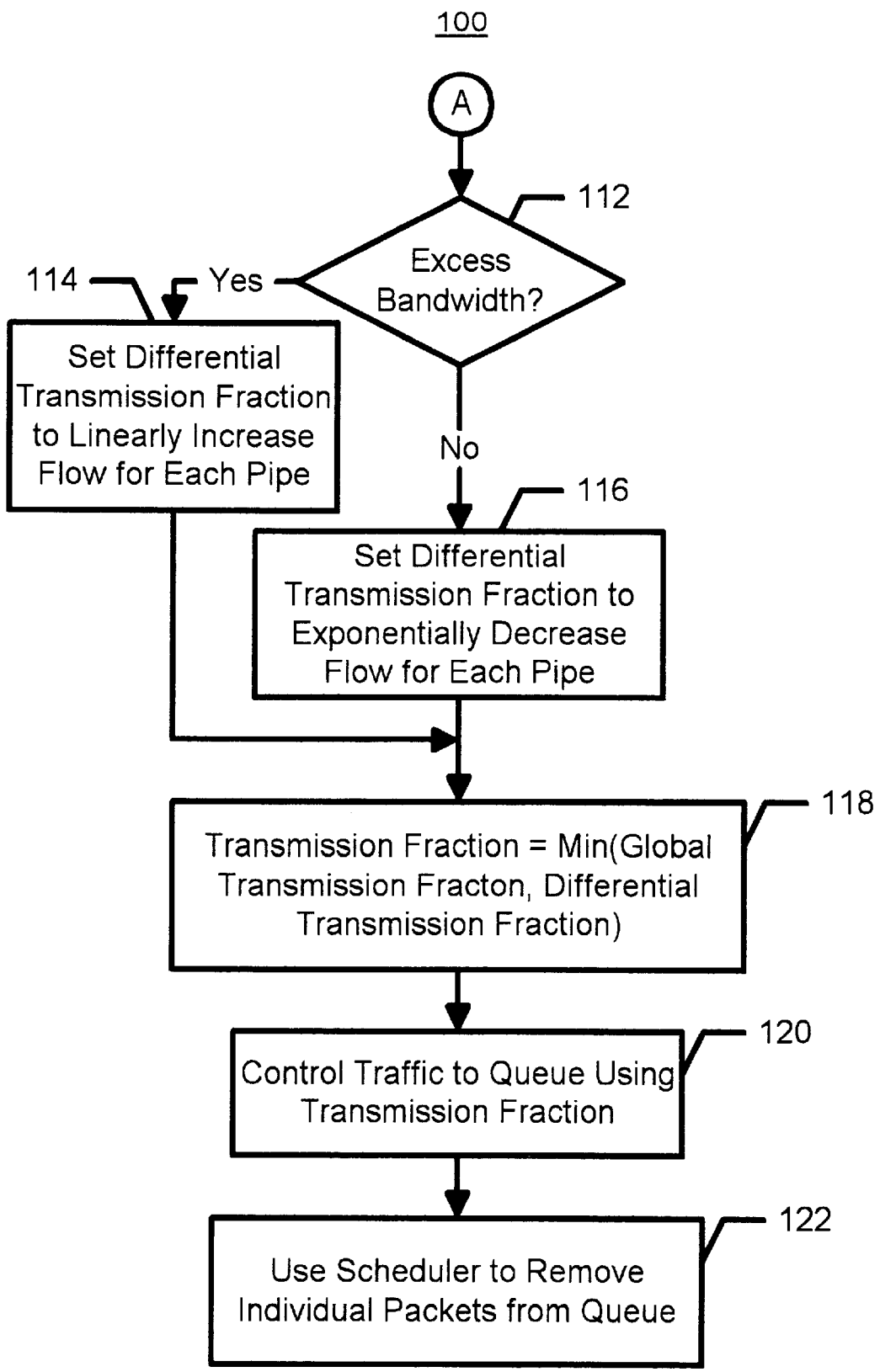

Referring to FIGS. 2A and 6, the method 100 will be described using the enqueuing mechanism 32, the queue 34 and the scheduler 35. However, nothing prevents the use of the method 100 with another enqueuing mechanism, queue, and scheduler. The method 100 is also preferably accomplished using the inventions disclosed in U.S. patent application Ser. No. 09/448,197, filed on Nov. 23, 1999, entitled "METHOD AND SYSTEM FOR PROVIDING DIFFERENTIATED SERVICES IN COMPUTER NETWORKS" and assigned to the assignee of the present application and in U.S. patent application Ser. No. 09/448,380, filed on Nov. 23, 1999, entitled "METHOD AND SYSTEM FOR CONTROLLING TRANSMISSION OF PACKETS IN COMPUTER NETWORKS" and assigned to the assignee of the present application. In addition, the method 100 is preferably used in conjunction with the scheduler described in co-pending U.S. patent application Ser. No. 09/548,907, filed on Apr. 13, 2000, entitled "NETWORK PROCESSOR SCHEDULER USING UNIQUE SCHEDULING STRUCTURE" and assigned to the assignees of the present application. Applicants hereby incorporate by reference the above-mentioned co-pending patent applications.

The minimum and maximum flows for pipes providing traffic to the queue 34 are set, via step 102. The pipes may come from any of the ports A 19 to the enqueuing mechanism 32. In a preferred embodiment, the pipes of interest are behavior aggregate flows. Thus, step 102 preferably sets the minimum and maximum bandwidth for behavior aggregate flows of interest. Furthermore, for each egress port, the sum of the minimum guaranteed flows for the pipes should be less than the sending capacity, S, of that port and in a preferred embodiment is less than half of the sending capacity, S, for the port. This is because flows are defined as a fraction of the total amount of traffic which the queue 34 can service. The minimum flow for a pipe can be zero. Typically, the queue 34 has a defined service rate, the rate at which the queue 34 can output items from the queue. Although in a preferred embodiment the maximum number of pipes serviced by the queue 34 is less than or equal to 2048, there is no real upper limit on the number of pipes controlled. In addition, each pipe offers traffic to the queue 34 at an offered rate, $I_i(t)$, where i denotes the $i^{th}$ pipe. Depending on different factors, some of the traffic may be dropped. The transmit fraction for the $i^{th}$ pipe, $T_i(t)$, is the fraction of traffic from the $i^{th}$ pipe which is transmitted to the queue 34. Thus, the instantaneous flow for the $i^{th}$ pipe is $f_i(t)=I_i(t)*T_i(t)$. In a preferred embodiment, the method 100 can also ensure that the pipes having traffic flowing through them have at least their minimum flows.

Once the minimum and maximum flows for the pipes are set, the processor may commence controlling traffic through the switch 10, via step 104. The queue level and offered rate for the prior epoch are determined, via steps 106 and 108, respectively. In a preferred embodiment, the queue level is determined at the end of the previous epoch and is the level of the memory resource. Also in a preferred embodiment, the offered rate determined in step 106 is the total offered input to the memory resource during the prior epoch. In a preferred embodiment, transmit fraction and the global transmit fraction, discussed below, for the prior epoch is also determined in step 104 or step 106. In an alternate embodiment, the determination of the queue level in the method 100 includes determining the level of the queue 34 corresponding to the enqueuing mechanism 32. Also in a preferred embodiment, the transmit fraction and global transmit fraction constant over an epoch and thus can be determined at any time during the previous epoch, but is preferably determined at the start of the previous epoch using the method 100.

The global transmit fraction is then controlled so that the global transmit fraction and queue level are critically damped over a range of queue levels if the global transmit fraction is used, via step 110. The global transmit fraction is controlled based on the queue level and the offered input. In a preferred embodiment, the global transmit fraction is also controlled based on the prior global transmit fraction. In a preferred embodiment, step 110 calculates a change in the global transmit fraction since the previous epoch in order to provide the desired global transmit fraction for critical damping and adds the change in the global transmit fraction to the global transmit fraction for the previous epoch. The range of queue levels over which the global transmit fraction is so controlled could extend over all possible queue levels. However, in a preferred embodiment, the range over which the global transmit fraction is controlled for critical damping is between a minimum queue level greater than or equal to zero and a maximum queue level less or equal to than the maximum possible queue level.

It is determined whether the queue 34 has excess bandwidth available, via step 112. In a preferred embodiment, excess bandwidth is determined not to exist if the queue level is increasing. Also in a preferred embodiment, excess bandwidth is determined to exist in step 112 if the queue 34 is empty or if the queue level for the queue 34 is zero, at a low level, or decreasing. Thus, step 112 preferably includes determining a queue level and comparing the queue level to a previous queue level. Also in a preferred embodiment, excess bandwidth is determined not to exist if the queue level is not either zero or decreasing. However, nothing prevents the use of another criteria for determining whether excess bandwidth exists.

If it is determined in step 112 that excess bandwidth exists, then a differential transmit fraction for the pipes is set to allow the flows for the pipes to increase linearly, via step 114. Preferably, step 114 is accomplished by linearly increasing the differential transmit fraction for each of the pipes. The linear increase for a pipe can be based on the minimum flow, the maximum flows or a weight. Thus, the linear increase for a pipe can be based on the pipe's minimum flow only, the maximum flow only, some combination of a minimum flow and the weight, some combination of the maximum flow and the weight, or some combination of the minimum and maximum flows and the weight. However, in a preferred embodiment, the linear increase for the pipe is based on the minimum flow for the pipe.

If it is determined in step 112 that excess bandwidth does not exist, then the differential transmit fraction is set to allow flows for the pipes to decrease exponentially, via step 116. Preferably, step 116 is accomplished by exponentially decreasing the differential transmit fraction for each pipe. The exponential decrease for a pipe can be based on the minimum flow or the maximum flow. Thus, the exponential decrease for a pipe can be based on the pipe's minimum flow only, the maximum flow only, or some combination of the minimum and maximum flows. However, in a preferred embodiment, the exponential decrease for the pipe is based on the minimum flow for the pipe. Because the decrease is exponential in nature, the decrease is also based on the current flow for the pipe.

The transmit fraction is then set to be the minimum of the global transmit fraction determined in step 110 and the differential transmit fraction determined in either step 114 or 116, via step 118. In one embodiment, step 118 can be performed using the global and differential transmit fractions determined for a previous epoch. In such a case, step 118 may be performed in parallel with steps 106 through 116.

The traffic to the queue 34 is then controlled based on the transmit fraction, via step 120. In a preferred embodiment, step 120 includes discarding packets, either randomly or based on other factors such as the packet priority, to ensure that the transmit fraction set in step 118 is maintained. In another embodiment, discard fractions can be used instead of transmit fraction. Typically, the discard fraction is one minus the transmit fraction.

The scheduler 35 is then used to schedule the removal individual packets from the queue to be sent toward the packets' final destinations, via step 122. The scheduler 35 thus allocates bandwidth for packets leaving the queue 34. In other words, the scheduler 35 allocates turns for frames to be sent from the queue 34. The scheduler 35 determines when packets that are allowed to enter the queue 34 in step 120 are removed from the queue 34 and transmitted toward their final destination. The scheduler 35 thus provides another level of control for traffic through the switch 10.

In a preferred embodiment, the scheduler 35 performs step 122 based on the characteristics of the packet which is presented to the scheduler 35 as well as the available bandwidth of subsequent resources such as a target port (e.g. one of ports B 36). The scheduler 35 will, therefore, schedule each packet so that it can be sent consistent with the requirements for that packet. For example, the scheduler 35 may be presented with a real-time packet. A real-time packet, such as a packet of voice data, may be concerned with the speed of transmission as well as the jitter in the transmission. In addition, the scheduler 35 may take into account the type of service paid for by the client sending or receiving the packet. The type of service may be represented by the minimum and maximum flows for the pipe from which the packet came or by the type of the packet itself. For a real-time packet, the scheduler 35 will schedule the packet in a high priority manner, so that the packet can arrive within the desired time frame. However, the scheduler 35 may also be presented with a data packet, for example one which merely requires best efforts to reach its destination. Best efforts is a cheap, low level of service which merely requires that best efforts of the network be used in sending the packet to its destination. The scheduler 35 may schedule such a packet at a much lower priority so that the packet is sent onward only when there is sufficient bandwidth in the switch 10 to forward the packet.

Use of the global transmit fraction and differential transmit fraction set in step 112 and 114 or 116, respectively, to determine the transmit fraction in conjunction with use of the scheduler in step 122 provides three benefits. First, the method 100 can ensure that the queue 34 does not become full through use of the global transmit fraction as the transmit fraction. Filling of the queue 34 would require dropping of any further packets to be placed in the queue 34, which is undesirable. The global transmit fraction may be selected in step 118 as the transmit fraction when the queue level for the queue 34 is high enough to cause a concern that the queue 34 may become full. Thus, the global transmit fraction is preferably seldom set as the transmit fraction in step 118.

When the global transmit fraction is used as the transmit fraction, critical damping is provided for the system described by the transmit fraction and the queue level. This allows the traffic through the queue 34 and, therefore, the switch 10 to rapidly reach a stable state. This stable state is at a queue level between the minimum and maximum desired queue levels, which can be set to ensure that the queue level never becomes high enough for the queue 34 to be in danger of becoming full. Because critical damping can be provided, the traffic through the queue 34, as described by the queue level and the transmit fraction, should reach the stable state in a minimum amount of time when the global transmit fraction is used. The global transmit fraction required for critical damping and the relationship between the transmit fraction and the queue level can be described using stability theory as follows.

The queue level and the discard rate can be thought of as variables which describe the state of the queue 34. When the queue level increases, the discard rate should increase to prevent the queue 34 from becoming filled. However, if the discard rate increases, the queue level should decrease. Thus, the queue can be thought of as having a positive negative feedback loop, or relationship, between the queue level and the discard rate. This relationship is what can cause oscillations in the conventional system. The present invention can be thought of as adding friction to the discard rate so that the discard rate does not change as rapidly with queue level as it does in conventional methods for controlling traffic, such as RED. As a result, oscillations can be damped or prevented. Thus, when the queue level for the queue 34 becomes a critically high level, the global transmit fraction will be used as the transmit fraction and the queue level will rapidly reach a stable state at a lower queue level, generally without the queue becoming full.

Second, the method 100 allows for differential services to be provided in a stable manner. Through step 118, the differential transmit fraction will be used in cases where the queue level is not in danger of exceeding a maximum desired queue level. In other words, the differential transmit fraction set in step 114 or 116 will generally be used to provide the transmit fraction in step 118. Because the differential transmit fraction increases flows linearly and decreases flows exponentially, the differential transmit fraction generally ensures that the traffic through pipes to the queue 34 can automatically and asymptotically reach stability. Flows will increase or decrease depending upon whether the queue 34 has excess bandwidth. When stability is reached, flows will linearly increase as long as excess bandwidth exists, then will exponentially decrease, due to the lack of excess bandwidth, until excess bandwidth again becomes available. This behavior will repeat. In other words, the traffic from the pipes can settle into a steady cyclic state known as a limit cycle. Thus, regardless of the state in which the traffic through the pipes commences, the system will move toward stable cyclic behavior. This stable behavior may not be achieved with another combination of increases and decreases. For example, an exponential increase and a linear decrease or an exponential increase and an exponential decrease may not produce stable behavior. Furthermore, the increase and decrease in the flow for each pipe will depend upon the minimum or maximum flow for the pipe and the previous flow for the pipe. Thus, different pipes may have different levels of flow, or service. Consequently, the differential transmit fraction can not only allocate produce stable behavior, but can also provide differentiated services and allocate excess bandwidth for the queue 34 fairly. All a network administrator or other user must do is set the minimum and maximum flows for customers differently depending upon the level of service desired for the particular customer. Thus, the method 100 can be used in a variety of applications, such as in networks using DiffServ, by internet service providers desiring to provide different levels of service to different customers or for different media. This is accomplished merely by allowing the minimum and maximum flow to be set for the behavior aggregate flows, the customers, the media, classes or other flows corresponding to the pipes in the method 100. Thus, the method 100 ensures not only that the queue level is controlled in a stable fashion, but also provides differential services in a stable fashion.

A third benefit of the method 100 is in the use of the scheduler 35 in step 122. Because the transmit fraction is set in step 118 to be the minimum of the global and the differential transmit fractions, the amount of traffic provided to the queue 34 can be controlled. As a result, the scheduler 35 can be provided with a feasible amount of work, which the scheduler 35 can accomplished at a desired rate. In other words, the method 100 may prevent the scheduler 35 from being presented with traffic from the queue at a rate higher than the scheduler 35 can process. This prevents the scheduler 35 from becoming full. As a result, latencies introduced because of the scheduler 35 can be reduced or eliminated. This prevents the formation of a backlog of packets upstream of the scheduler 35 with unpredictable effects on latency, losses, bandwidth allocation and jitter.

Figure 7:
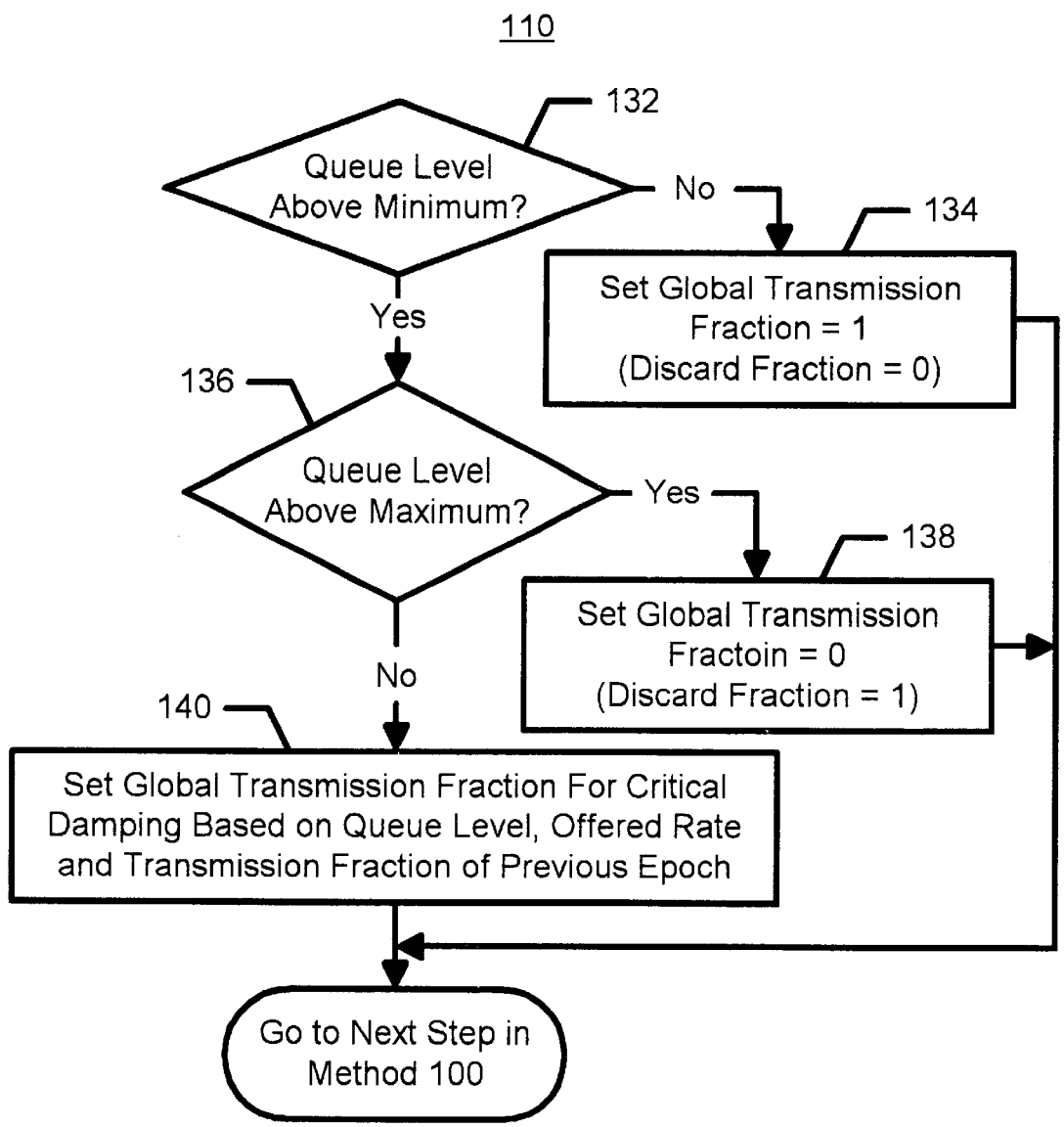
FIG. 7 is a flow chart depicting one embodiment of a method in accordance with the present invention for providing the global transmit fraction in accordance with the present invention.

FIG. 7 depicts a more detailed embodiment of step 110, controlling the global transmit fraction based on the queue level and offered rate. Step 110 commences after the global transmit fraction, queue level and offered rate for the previous epoch have been determined. In a preferred embodiment, the global transmit fraction for the previous epoch was determined in a previous iteration of the method 110. However, the transmit fraction may be determined if not already available. The queue level is preferably determined relative to a minimum queue level, $Q_{min}$, and a maximum queue level, $Q_{max}$, at the end of the epoch.

It is then determined whether the queue level is above $Q_{min}$, via step 132. If not, then the global transmit fraction is set to one, via step 134. Step 134 thus ensures that all packets will be transmitted by the enqueuing mechanism 32 to the queue 34 if the queue level is low enough. If it is determined that the queue level is above $Q_{min}$ in step 132, then it is determined whether the queue level is above $Q_{max}$, via step 136. If the queue level is above $Q_{max}$, then the global transmit fraction is set to zero, via step 138. Thus, step 138 ensures that all packets will be discarded if the queue level is too high.

If the queue level is neither below $Q_{min}$ nor above $Q_{max}$, then the global transmit fraction is controlled for critical damping, via step 140. To more clearly explain the used in setting the global transmit fraction, it will be assumed that the offered rate to the queue 34, I(t), and the output rate from the queue 34, O(t), are constant at equilibrium, the stable state. However, the analysis holds true even where I(t) and O(t) continue to vary, as is generally true of a network.

At equilibrium, the rate of change of the queue level with respect to time and the rate of change of the transmission with respect to time should be zero if the output rate and offered rate are constant. In other words, at equilibrium:

$$0 = I(t)*gT(t) - O(t)$$

$$0 = \kappa(t)*(\beta - \alpha\gamma T(t) - Q/Q_{max})$$

$$I(t) = I$$

$$= \text{constant}$$

$$O(t) = O$$

$$= \text{constant}$$

$$gT(t) = \text{global transmit fraction}$$

Consequently, at equilibrium, $$gT = O/I$$

$$\alpha*gT = \beta - Q/Q_{max}$$

For clarity, also assume that at minimum, $Q/Q_{max}$ is a constant, such as 0.25. It is decided that the maximum ratio of I/O that is allowed in the domain of stability is 1.6; at this I/O ratio, Q reaches $Q_{max}$ and T=⅝. Likewise, it is decided at Q less than or equal to $Q_{max}/4$ that gT should be equal to one. Thus, at these two extreme equilibria:

$$0 = \beta - \alpha*⅝ - 1$$

and $$0 = \beta - \alpha - ¼$$

From these assumptions, the numerical values of $\alpha$ and $\beta$ can be determined to be 2 and 2.25, respectively. Note that other tolerances for $Q/Q_{max}$ and I/O can be made to have other numerical values of $\alpha$ and $\beta$. Thus, $\alpha$ and $\beta$ can be determined based on equilibrium conditions and some assumptions about the ranges in which the switch 10 or 10' is desired to operate. For stability, it can be shown that:

$$\alpha^2*\kappa^2(t) = 4*\kappa(t)*I/Q_{max}$$

or $$\kappa(t) = 4*I/(Q_{max}*\alpha^2)$$

$$= I(t)/Q_{max} \text{ for the assumption made above}$$

Thus, $\kappa(t)$, $\alpha$ and $\beta$ can chosen to result in a transmit fraction that will provide critical damping in the values for which the system is desired to operate. Using the equations above, the transmit fraction desired for providing critical damping can be provided for the switch 10. For example, using the assumptions above for $Q/Q_{max}$ and I/O, the system described by the transmit fraction and the queue level are:

$$Q(t+Dt)=Q(t)+[I(t)*gT(t)-O(t)]*Dt$$

$$gT(t+Dt)=gT(t)+(I(t)*Dt/Q_{max})*(2.25-2*gT(t)-Q(t)/Q_{max})*Dt$$

where:

$Dt$ = Time interval between calculations of $Q$ and $gT$

= Time for an epoch $Q(t)/Q_{max}$ is greater than or equal to 0.25

$I(t)/O(t)$ is less than or equal to 1.6

In order to account for the situations where the above conditions of Q(t), I(t) and O(t) are violated, the transmit fraction can be changed based on the queue level. For example, the transmit fraction can be made to be one when $Q/Q_{max}$ is less than 0.25. Similarly, when $I(t)/O(t)$ is larger than 1.6, the queue will begin to fill more rapidly than desired. Consequently, the transmit fraction can be set to zero or some small value when the queue reaches a level at or near a maximum value.

Thus, the global transmit fraction is set for critical damping based on the queue level, offered rate and transmit fraction from the previous epoch, as well as the length of the epoch. If the global transmission is used as the transmit fraction, the packets are transmitted or discarded by the enqueuing mechanism 32 so that the fraction of packets provided to the queue 34 is equal to the transmit fraction. The packets are preferably randomly discarded, in a similar manner to what is used in conventional RED. However, the packets can also be discarded based on their priority. Furthermore, a notification is preferably sent back to the hosts sending the discarded packets so that the hosts can temporarily suspend traffic to the switch 10.

Thus, the global transmit fraction can be set for critical damping using the method 110. Preferably critical damping can occur only in a desired range of queue levels. Outside of this range, the global transmit fraction is set to zero or one, depending on whether the queue level is determined to be too high or too low for a critical damping calculation. Because packets can be discarded randomly or based at least in part on their priority, synchronization of hosts sending traffic to the switch 10 or 10' can be prevented. Because critical damping is provided, the methods 100 and 110 can provide better stability for the system than the conventional method 50 (RED). The methods 100 and 110 also reach equilibrium more rapidly than the method 70 (BLUE) because critical damping is provided. Consequently, performance of a network using the switch 10 or 10' that utilize the method 100 or 110 is improved.

Figure 8:
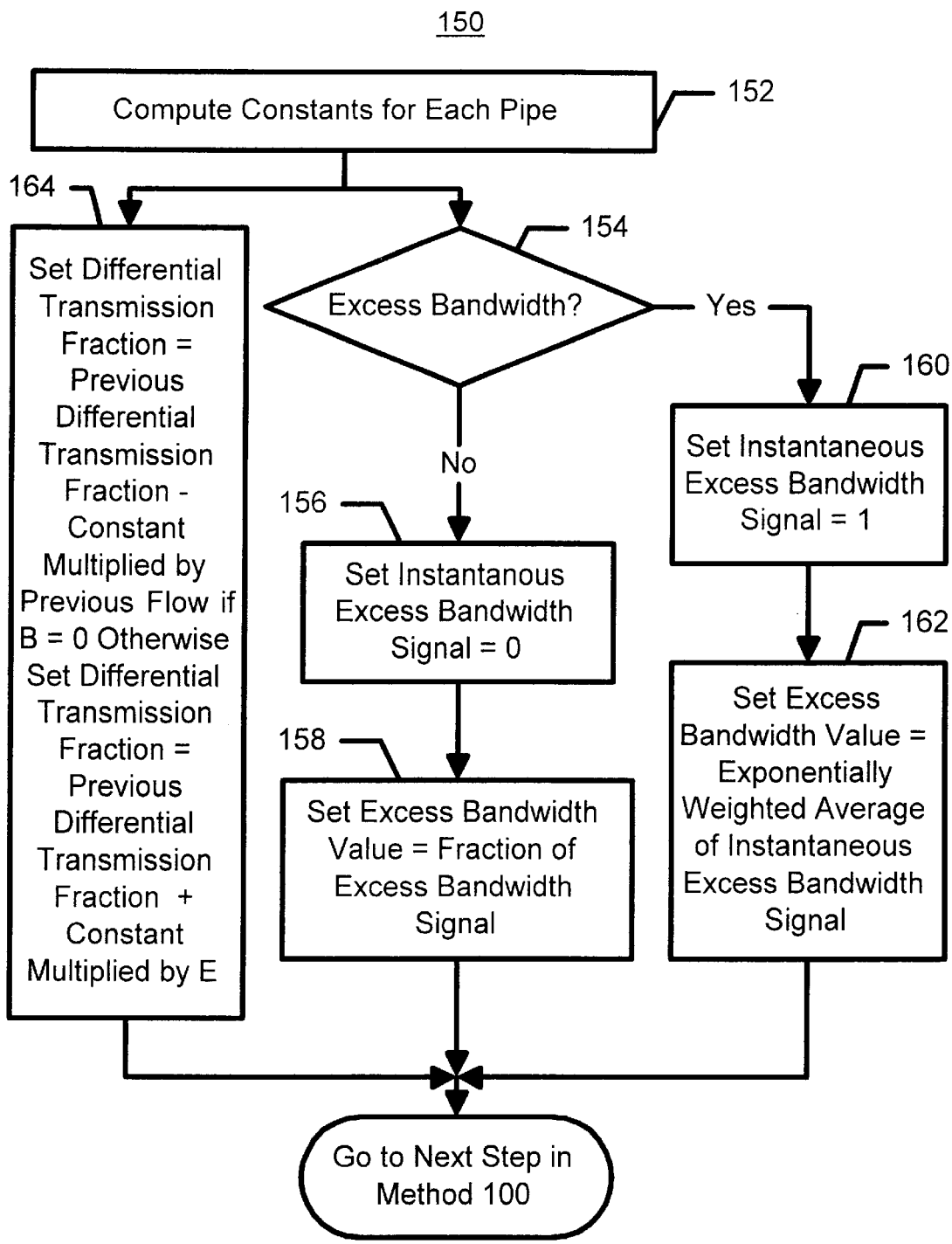
FIG. 8 is a flow chart depicting one embodiment of a method in accordance with the present invention for providing the differential transmit fraction in accordance with the present invention.

FIG. 8 depicts a more detailed flow chart of a method 150 in accordance with the present invention for providing the differential transmit fraction. Thus, the method 150 may be used to perform steps 112, 114 and 116 of the method 100 depicted in FIGS. 6A and 6B. Referring back to FIG. 8, it is assumed that the queue level, an instantaneous excess bandwidth signal, B, and an excess bandwidth value, E, are already available, preferably from a previous iteration of the method 150. However, if not available, these values should be calculated. In a preferred embodiment, the flows for the prior epoch should also be available.

The method 150 commences after the minimum and maximum flows for each of the pipes being controlled have been set, for example by a network administrator. Constants are computed for each of the pipes based on the minimum and maximum flows for the pipe, via step 152. For each pipe, i, a constant $C_i$ and a constant $D_i$ are computed in step 152. The constant $C_i$ is used for linearly increasing the flow for pipe i, as discussed below. Similarly, the constant $D_i$ is used for exponentially decreasing the flow for the pipe i, as discussed below. In a preferred embodiment, the constants $C_i$ and $D_i$ are both based on the minimum flows. In an alternate embodiment, weights for different pipes can also be provided. In such a case, the constant $C_i$ and $D_i$ may also be calculated based on the weights provided.

Constants for increasing or decreasing the flows for the pipes are determined based on the minimum flows and, where used, the weights. Preferably, the constant for increasing the flow, $C_i$, and the constant for decreasing the flow, $D_i$, of a pipe are calculated as follows:

$$C_i = (W_i/W) * \left(S + f_{imin} - \sum_j f_{jmin}\right)/16$$

If all of the weights are equal to one, as in a preferred embodiment, then:

$$C_i = \left(S + f_{imin} - \sum_j f_{jmin}\right)/16$$

$$D_i = (S - f_{imin}) * 4$$

where:

$W_i$=weight for the $i^{th}$ pipe, which is preferably in the range [0,1]

W=sum of all N weights $f_{imin}$=minimum flow for the $i^{th}$ pipe

In addition, the flow units are again chosen so that Dt is one and $Q_{max}$ is one.

Once the constants are determined, traffic is allowed to flow through the pipes to the queue 34. It is determined whether excess bandwidth exists, via step 154. In a preferred embodiment, excess bandwidth is determined to exist only if the queue level for the queue 34 is zero or is decreasing. Otherwise it will be determined that excess bandwidth does not exist. However, nothing prevents the use of another criteria for determining whether excess bandwidth exists. In a preferred embodiment, the queue level determined is the level for the entire memory resource. However, nothing prevents the queue level being determined for a logical queue or subqueue. If excess bandwidth does not exist, then an instantaneous excess bandwidth signal, B, is set to zero, via step 160. The signal B is termed instantaneous because it is based upon a single measurement of the queue level and a single determination of the change in the queue level. An excess bandwidth value, E, is then set to be a constant, preferably 31/32, times its previous value plus one minus the same constant, preferably 1/32, times B, via step 162. Thus, in a preferred embodiment, the excess bandwidth value E is the exponentially weighted average of the instantaneous excess bandwidth signal B. The excess bandwidth value is appropriately set in step 162 because the instantaneous excess bandwidth signal is zero.

If it is determined in step 154 that excess bandwidth does exist, then the instantaneous excess bandwidth signal is set to one, via step 156. The excess bandwidth value E is then set to an exponentially weighted average of the instantaneous excess bandwidth signal, via step 158. Thus, in a preferred embodiment, the excess bandwidth value is a first constant multiplied by a previous excess bandwidth value plus a second constant multiplied by the instantaneous excess bandwidth signal. The first and second constant may both be less than one and are preferably 31/32 and 1/32, respectively. In a preferred embodiment, the exponentially weighted bandwidth value is set to be:

$$E(t+Dt)=(31/32)*E(t)+B(t)/32$$

Where:

$E(t+Dt)$=Excess bandwidth value for current epoch $E(t)$=Excess bandwidth value for previous epoch $B(t)$=Instantaneous excess bandwidth signal for the previous epoch In a preferred embodiment, the differential transmit fraction for each pipe i is set, via step 164, in parallel with the steps 154 through 162. However, in an alternate embodiment, the differential transmit fraction can be updated serially with the instantaneous excess bandwidth signal and the excess bandwidth value. If the previous instantaneous excess bandwidth signal, B, was one (excess bandwidth available), then step 164 would set the differential transmit fraction for each pipe i based on the previous differential transmit fraction, the constant $C_i$, and the excess bandwidth value. Preferably, the differential transmit fraction set in step 164 for excess bandwidth previously existing is:

$$T_i(t+Dt)=T_i(t)+C_i*E(t)$$

Where:

Dt=Length of an epoch (time since transmit fraction last calculated)

$T_i(t)$=Differential transmit fraction for the previous epoch (time t) for the $i^{th}$ pipe Preferably, the flow units are set so that Dt and the maximum possible queue level, $Q_{max}$, are one. Thus, the differential transmit fraction linearly decreases. Furthermore, the differential transmit fraction will continue to linearly increase as long as excess bandwidth continues to exist. If excess bandwidth did not exists in the previous epoch (B was zero), then in step 164 the differential transmit fraction, $T_i(t+Dt)$ for each pipe i is then set based on a previous differential transmit fraction for the pipe, $T_i(t)$, $D_i$, and the previous flow for the pipe, $f_i(t)$. The differential transmit fraction when excess bandwidth did not previously exist is preferably given by:

$$T_i(t+Dt)=T_i(t)-D_i*f_i(t)$$

Thus, the differential transmit fraction set in step 164 ensures that the differential transmit fraction and, therefore, the flow will exponentially decrease as long as excess bandwidth continues not to exist.

Figure 9:
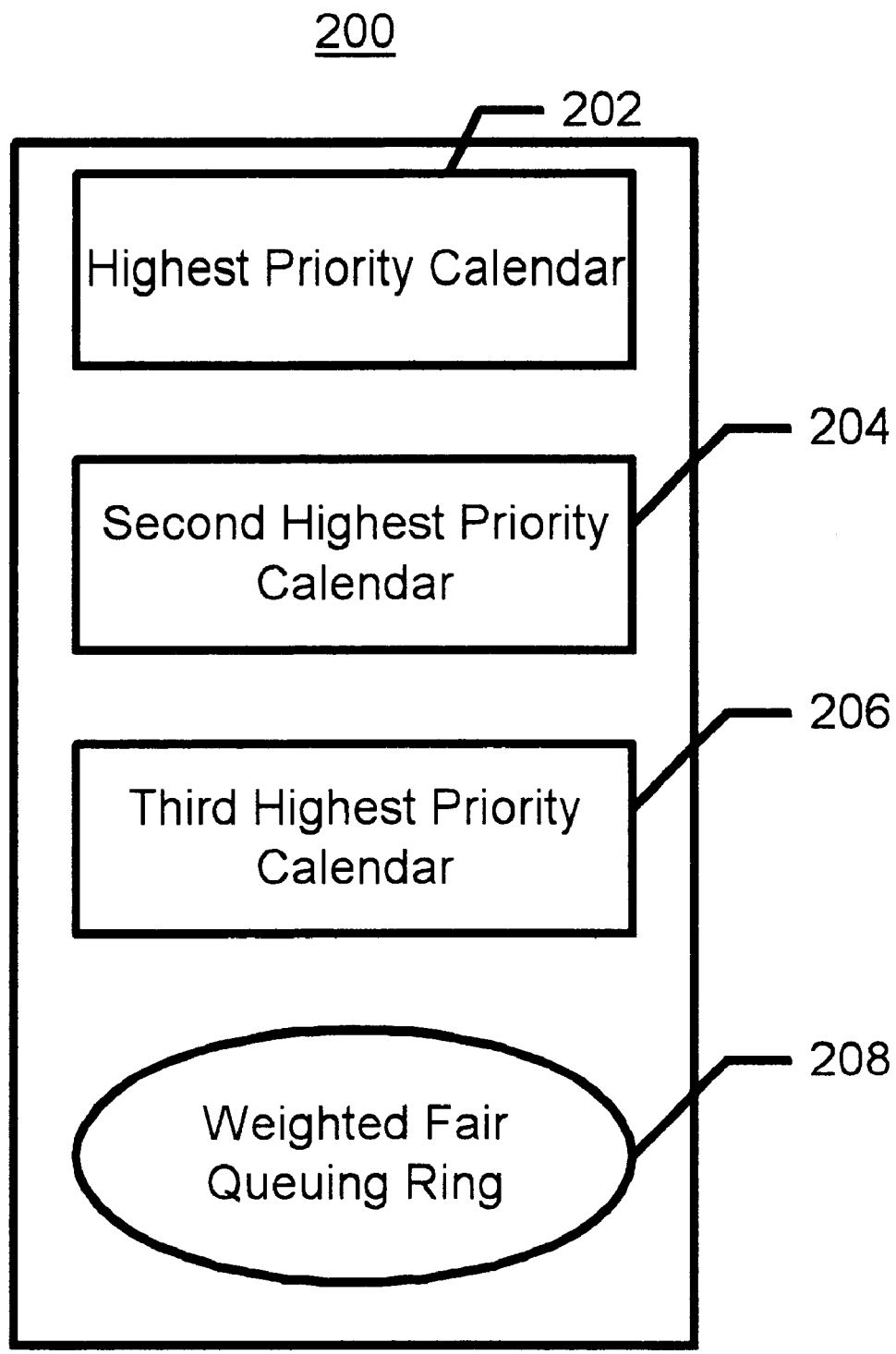
FIG. 9 is a block diagram depicting one embodiment of a scheduler in accordance with the present invention.

FIG. 9 depicts a preferred embodiment of a scheduler 200 used with the present invention. The scheduler 200 is thus preferably used as the scheduler 21, 25, 29, 35, 21', 25', 29' and 35', particularly schedulers 35 and 35'. The scheduler 200 includes calendars 202, 204 and 206 as well as a weighted fair queuing ring ("ring") 208. However, note that other schedulers (not shown) could be used with the present invention. For example, one or more FIFOs, which is simpler than the scheduler 200 might be used. In another embodiment, an EDF (earliest deadline first) scheduler, which reviews the deadline of each packet and places the packet having the earliest deadline first in line to be sent might be used. Similarly, in yet another embodiment, another scheduler might be used. In general, whatever scheduler is used, it may be presumed that the scheduler repeatedly accomplishes some desired policy or combination of policies by repeatedly choosing the next packet to send. In one preferred embodiment, the policies might be simple and scheduling might be accomplished by two FIFO mechanisms (one for real-time traffic with absolute priority and the other for all other traffic, served only when the first FIFO is empty). Alternatively, in an alternate preferred embodiment, several policies entailing sustained send rate, peak send rate, maximum burst size and jitter limits might be enforced by a sophisticated scheduler. In all cases, the scheduler itself does not exert flow control, the purposeful dropping of low value packets during congestion. Instead, the upstream flow control mechanism described above, which uses the global and differential transmit fractions, provides flow control while serving the competing goals of simplicity, robustness, stability, fair bandwidth allocation, low drop rates, low buffer occupancy and high utilization.

Each calendar 202, 204 and 206 function as discussed previously. Thus, each calendar 202, 204 and 206 has a particular number of positions. Note that the number of positions in one calendar 202, 204 or 206 may be different from the number of positions in another calendar 202, 204 or 206. Each position can hold exactly zero or one packet to be sent. In the context of this disclosure, a scheduler, such as the scheduler 200, a calendar 202, 204 or 206 or a ring 208 will be described as having a packet. However, the scheduler 200, calendar 202, 204 or 206 and ring 208 preferably use an identifier for the packet, rather than the packet itself.

Each calendar 202, 204 or 206 spends a particular amount of time in each position. In a preferred embodiment, the calendar 202 is a low latency calendar and thus has the highest priority of the calendars 202, 204 and 206. The calendar 204 is a normal latency calendar and thus has the second highest priority of the calendars 202, 204 and 206. The calendar 206 is a peak rate calendar and thus has the lowest priority of the calendars 202, 204 206. In a preferred embodiment, therefore, the time spent in each position for the calendar 202 is less than the time spent in each position for the calendar 204. Similarly, the time spent in each position for the calendar 204 is less than the time spent in each position for the calendar 206. The calendars 202, 204 and 206 are thus used for scheduling highest, normal and lowest priority packets. By traversing the positions in each of the calendars 202, 204 and 206, the scheduler 200 ensures that packets are sent from the corresponding queue, such as the queue 16, consistent with the priority of packet.

The ring 208 is preferably used for scheduling the lowest priority packets. Thus, a packet placed in the ring 208 has a lower priority than a packet placed in one of the calendars 202, 204 and 206. The ring 208 is preferably work conserving. Thus, over a particular amount of time, the ring 208 will do a constant amount of work as long as the ring 208 is not empty. The ring 208 also has a particular number of positions. Each position in the ring 208 can hold exactly zero or one packet. However, when the ring 208 is traversed, the ring 208 goes directly to the next occupied position, skipping any positions which are not occupied. As a result, the ring 208 is work conserving.

Figure 10:
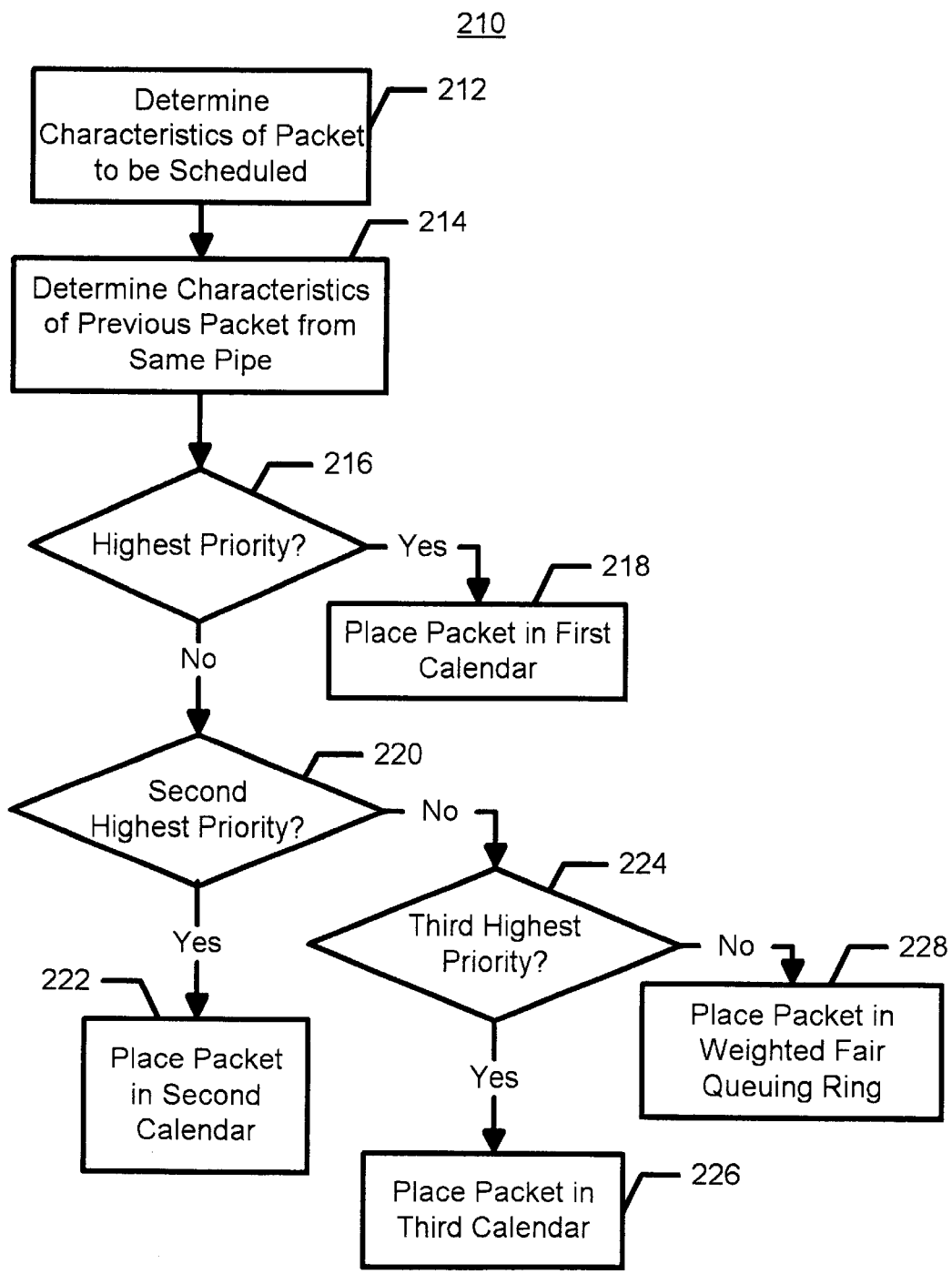
FIG. 10 is a flow chart depicting one embodiment of a method for scheduling an individual packet in accordance with the present invention

FIG. 10 depicts a simplified flow chart of one embodiment of a method 210 for scheduling packets using the scheduler 200. The characteristics, such as the type, of the packet to be scheduled is determined, via step 212. The type of packet to be scheduled could be based in part on the kind of data carried by the packet, for example real time data such as video versus pure data such as an email. In addition, the type of pipe from which the packet came can also be considered. For example, in one embodiment, the type of pipes generally available are expedited forwarding (EF), best efforts (BE) and assured forwarding (AF). Typically, an EF pipe carries real time traffic. An EF pipe allows traffic to flow up to a guaranteed maximum flow rate and thus provides a high, and relatively expensive, level of service. Traffic carried by the EF pipe above the guaranteed maximum flow rate may be discarded. Thus, traffic for an EF pipe is likely to be mapped to a high priority calendar, such as the calendar 202, but might also be mapped to the calendars 204 and 206. A BE typically carries low priority traffic, such as data packets. A BE pipe typically carries traffic using resources of the network that are available after higher priority traffic has been allocated at least its minimum bandwidth. Traffic for a BE pipe may thus be mapped to the ring 208. An AF pipe has a guaranteed minimum rate, for which a customer typically pays a premium price. However, the AF pipe may be allocated some portion of any excess resources, or bandwidth, available in the network. Traffic for the AF pipe may thus be mapped to some combination of the calendars 202, 204 and 206 and the ring 208.

In a preferred embodiment, the characteristics, such as the type, of the previous packet from the same pipe (the corresponding pipe) as the packet to be scheduled is also determined, via step 214. It is then determined whether the packet to be scheduled is of the highest priority, via step 216. The "highest priority" considered in step 216 could be a range of high priorities. In addition, the determination of the priority of the packet could take into account the priority of the previous packet and the flow rate for the corresponding pipe. For example, if a packet has a high priority such as a real time packet, but it is indicated that the corresponding pipe has a flow which is higher than the guaranteed rate, the packet may not be considered to be of the highest priority. If the packet is of the highest priority, then the packet is placed in a position in the calendar 202, via step 218. In one embodiment, the position in which the packet is placed takes into account the priorities of some number of the other packets within the calendar 202. In one embodiment, the packet is placed in an open position in the calendar 202. However, in an alternate embodiment, the packet might be placed in an occupied position and the packet from that occupied position moved to another position.

If the packet is not of the highest priority, then it is determined whether the packet is of the second highest priority, via step 220. The "second highest priority" considered in step 220 could be a range of priorities. In addition, the determination of the priority of the packet could take into account the priority of the previous packet and the flow rate for the corresponding pipe. If the packet is of the second highest priority, then the packet is placed in a position in the calendar 204 having the second highest priority, via step 222. In one embodiment, the position in which the packet is placed takes into account the priorities of some number of the other packets within the calendar 204. In one embodiment, the packet is placed in an open position in the calendar 204. However, in an alternate embodiment, the packet might be placed in an occupied position and the packet from that occupied position moved to another position.

If the packet is not of the second highest priority, then it is determined whether the packet is of the third highest priority, via step 224. The "third highest priority" considered in step 224 could be a range of priorities. In addition, the determination of the priority of the packet could take into account the priority of the previous packet and the flow rate for the corresponding pipe. If the packet is of the third highest priority, then the packet is placed in a position in the calendar 206 having the third highest priority, via step 226. In another embodiment, the position in which the packet is placed takes into account the priorities of some number of the other packets within the calendar 206. In one embodiment, the packet is placed in an open position in the calendar 206. However, in an alternate embodiment, the packet might be placed in an occupied position and the packet from that occupied position moved to another position.

If the packet is not of the third highest priority, then the packet is placed in a position in the ring 208, via step 228. In one embodiment, the position in which the packet is placed takes into account the priorities of some number of the other packets within the ring 208. In one embodiment, the packet is placed in an open position in the ring 208. However, in an alternate embodiment, the packet might be placed in an occupied position and the packet from that occupied position moved to another position. In a preferred embodiment, step 228 takes into account the size of the previous packet from the same pipe in placing the packet in the ring 208. For example, if no previous packet exists, then the packet is preferably placed in the most remote unoccupied position of the ring 208. However, if the previous packet from the same pipe was large, then the packet is preferably placed at a more remote unoccupied position. If the previous packet from the same pipe was small, then the packet is preferably placed at a closer unoccupied position in the ring 208. Thus, a pipe sending larger packets will have fewer turns (positions) for each traversal of the ring 208. The placement of packets is preferably based partially on the size of a previous packet from the same pipe in order to ensure that the ring 208 does work on different pipes at approximately the same rate.

Figure 11:
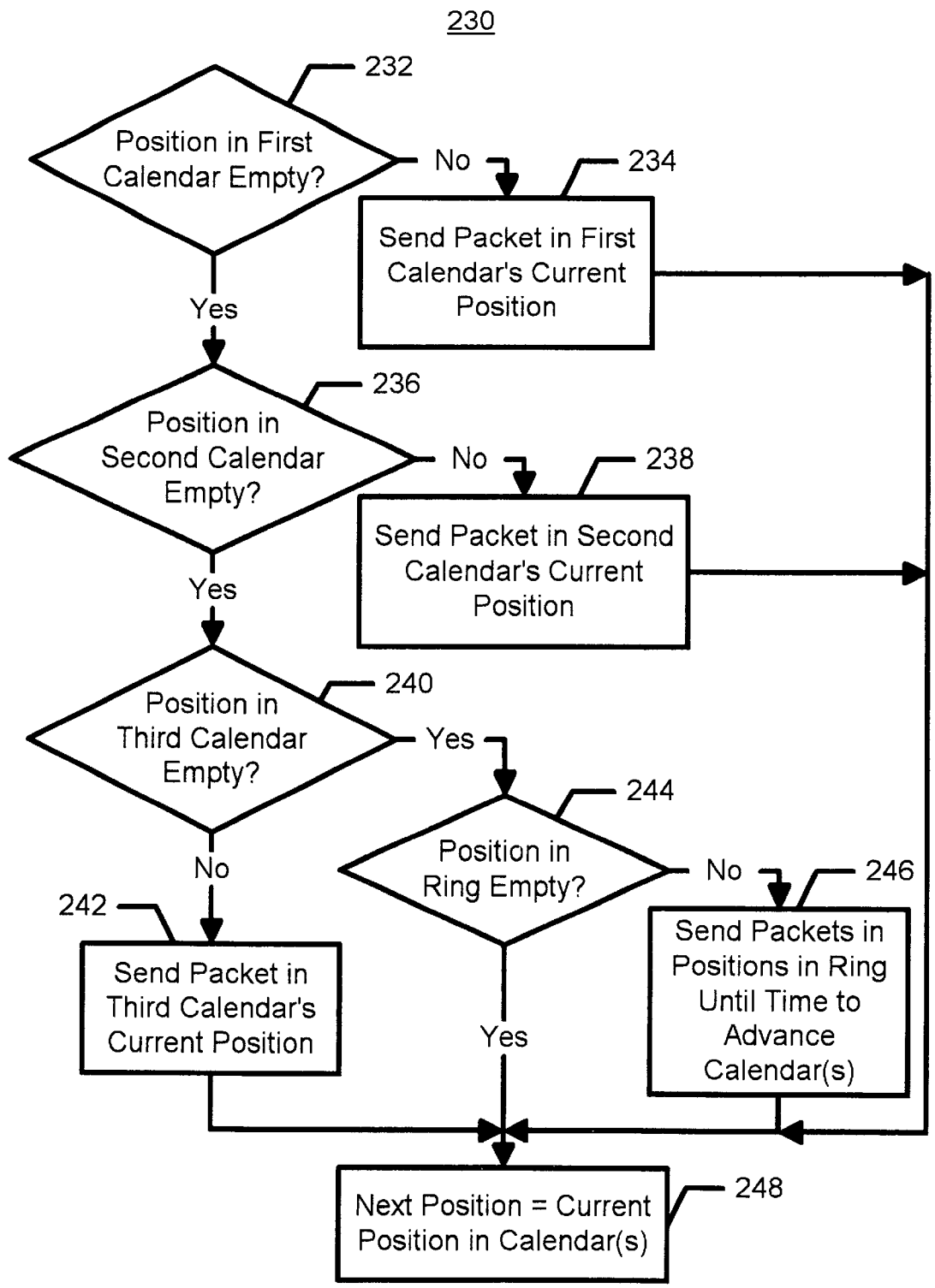
FIG. 11 is a flow chart depicting one embodiment of a method for determining which packet to remove from the queue in accordance with the present invention.

FIG. 11 is a flow chart depicting one embodiment of a method 230 for sending packets from the corresponding queue based on the packets positions in the calendars 202, 204 and 206 and the ring 208. In general, the scheduler 200 will send packets from the calendar 202 more rapidly from the calendar 204. The scheduler 200 will also send packets from the calendar 204 more rapidly from the calendar 206. The scheduler 200 will also send packets from the calendar 206 more rapidly from the ring 208. Thus, packets scheduled using the calendars 202, 204 and 206 are preferably sent before a packet scheduled in the ring 208.

It is determined whether a current position in the highest priority calendar 202 is empty, via step 232. If the current position is not empty, then the packet in the current position for the calendar 202 is removed from the queue and sent to the next portion of the switch, via step 234. If the current position in the calendar 202 is empty, then it is determined whether a current position in the second highest priority calendar 204 is empty, via step 236. If the current position in the calendar 204 is not empty, then the packet in that position is removed from the queue and sent to the next portion of the switch, via step 238. If the current position in the calendar 204 is empty, it is determined whether a current position in the third highest priority calendar 206 is empty, via step 240. If the current position in the calendar 206 is not unoccupied, then the packet in the calendar 206 is removed from the queue and sent to the next portion of the switch, via step 242. If the current position in the calendar 206 is unoccupied, then it is determined whether a current position in the ring 208 is empty. If not, then packets corresponding to positions in the ring 208 are removed from the queue and sent to the next portion of the switch until it is time to move to the next position in one of the calendars 202, 204, or 206. Preferably, this occurs when the next position in the calendar 202 is to become the current position. This is because the highest priority calendar 202 preferably spends the shortest amount of time in each position.

The next position in the calendar or calendars is then made the current position in the calendar, via step 248. Regardless of which portion of the scheduler 200 sends the packet, at least one of the calendars is advanced. In a preferred embodiment, step 248 advances at least the calendar 202 to the next position. Also in a preferred embodiment, the calendars 204 and 206 advance to their next position at multiples of the time in which the calendar 202 advances to the next position. For example, in one embodiment, the calendar 204 advances to the next position each time the calendar 202 has advanced to the next position five hundred and twelve times. Thus, in a preferred embodiment, step 248 may advance multiple calendars 202, 204 and 206 to the next position. The method 230 may then be repeated. Thus, using the methods 210 and 230, the flow of traffic and sustained and peak rates and burst sizes are treated is desired. If the rate of flow of traffic is at or below the sustained rate, then packets are allowed to enter the high priority calendar 202 at regular intervals. If the rate of flow of traffic is above the sustained rate but below the peak rate, then for a time that is determined by the burst size, packets are still scheduled in the higher priority calendars 202, 204 and 206. If the traffic remains above the sustained rate and below the peak rate for a longer time, then packets are entered into the ring 208, which ensures only best efforts are used to send the packets. If the flow later falls back to at or below the guaranteed, or sustained rate, then packets may once again be scheduled in the high priority calendar. Packets are then removed from queue using the calendars 202, 204 and 206 and the queue 208 and the method 230.

Thus, the scheduler 200 schedules the removal of individual packets from the queue, such as the queue 16, from different pipes based on characteristics of the packets as well as characteristics of the pipe from which the packet came, such as the characteristics of a previous packet from the pipe. As a result, the scheduler 200 can finely control traffic through the switch.

Thus, using the methods 100, 110, 150, 210 and 230, the scheduler 200 and the switch 10 or 10' traffic can be controlled. It may be assured that memory resources of the switch will not be exhausted, for example through the use of the global transmit fraction. In particular, the queue level for a particular memory resource can be driven to be a small value in most situations. A small queue level ensures not only that the queue will not be exhausted, but also that jitter and other undesirable phenomenon due in part to a filled or nearly filled queue can be reduced or avoided. In addition, differentiated services can be provided, for example through the use of the differential transmit fraction. Thus, different customers can be provided with different levels of services. In addition, the scheduler 200 can ensure that traffic is controlled at the packet level. Furthermore, use of the scheduler 200 and the methods 210 and 230 in conjunction with the methods 100, 100 and 150 can ensure that the scheduler 200 is provided with a feasible amount of work to accomplish. Thus, additional latencies due to the scheduler 200 may be reduced or eliminated.

A method and system has been disclosed for controlling traffic through a network. Software written according to the present invention is to be stored in some form of computer-readable medium, such as memory, CD-ROM or transmitted over a network, and executed by a processor. Consequently, a computer readable medium is intended to include a computer readable signal which, for example, may be transmitted over a network. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a plurality of pipes in a computer network including at least one processor for a switch, the at least one processor having a queue, the plurality of pipes utilizing the queue for transmitting traffic through the switch, the method comprising the steps of:

(a) allowing a minimum flow and a maximum flow to be set for each of the plurality of pipes;

(b) determining if excess bandwidth exists for the queue;

(c) determining a queue level for the queue;

(d) determining an offered rate of the plurality of packets to the queue;

(e) controlling a global transmit fraction of the plurality of packets to the queue, based on the queue level and the offered rate, so that the global transmit fraction and the queue level are critically damped if the queue level is between at least a first queue level and a second queue level;

(f) setting a transmit fraction for a flow for a pipe of the plurality of pipes to be a minimum of the global transmit fraction and a differential transmit fraction, the differential transmit fraction capable of linearly increasing the flow based on the minimum flow or the maximum flow if excess bandwidth exists and if the flow for the pipe of the plurality of pipes is less than the maximum flow for the pipe and capable of exponentially decreasing the flow for the pipe of the plurality of pipes based on the minimum flow or the maximum flow if excess bandwidth does not exist and the flow is greater than the minimum flow for the pipe, such that the traffic through the queue is stable;

(g) controlling transmission of traffic to the queue based on the transmit fraction; and (h) utilizing a scheduler to control traffic from the queue.

2. The method of claim 1 wherein the transmit fraction setting step (f) further includes the step of:

(f1) setting the differential transmit fraction for the flow to be a previous differential transmit fraction plus a first quantity if excess bandwidth exists, the first quantity being a first constant multiplied by an excess bandwidth value; and (f2) setting the differential transmit fraction to be the previous differential transmit fraction minus a second quantity if excess bandwidth does not exist, the second quantity being the previous flow multiplied by a second constant.

3. The method of claim 1 wherein the transmit fraction setting step (f) further includes the step of:

(f1) setting the differential transmit fraction for the flow to a first constant if a sum of a plurality of flows from the plurality of pipes is greater than a first queue level;

(f2) setting the differential transmit fraction for the pipe to be the minimum of one and a previous differential transmit fraction for the pipe plus the first constant if the flow for the pipe is less than or equal to the minimum flow for the pipe;

(f3) setting the differential transmit fraction to be the previous transmit fraction for the pipe multiplied by a second constant if the flow for the pipe is greater than the maximum flow for the pipe, the second constant being less than one; and (f4) otherwise setting the transmit fraction for the pipe to be the minimum of a global transmit fraction and a first quantity, the first quantity being the previous differential transmit fraction plus a second quantity if excess bandwidth exists, the first quantity being the previous differential transmit fraction minus a third quantity if excess bandwidth does not exist, the second quantity being a third constant multiplied by a signal, the third constant depending on the minimum flow, the signal approaching one for repeated instances of excess bandwidth and approaching zero for repeated instances of no excess bandwidth, the third quantity being a fourth constant depending on the minimum flow multiplied by the previous flow.

4. The method of claim 1 wherein the setting step (f) is performed for each of the plurality of pipes.

5. The method of claim 1 wherein the excess bandwidth determining step (b) further includes the steps of:
(b1) determining the queue level for the queue;
(b2) determining whether the queue level has increased or decreased; and
(b3) determining that the excess bandwidth exists if the queue level has decreased or is zero and determining that excess bandwidth does not exist otherwise.

6. The method of claim 5 wherein the excess bandwidth determining step (b3) further includes the step of:
(b3i) setting an instantaneous excess bandwidth signal to be one if the queue level has decreased or is zero and setting the instantaneous excess bandwidth signal to be zero otherwise.

7. The method of claim 6 wherein the excess bandwidth determining step (b3) further includes the step of:
(b3ii) setting an excess bandwidth value to be an exponentially weighted average of the instantaneous excess bandwidth signal.

8. The method of claim 1 wherein the global transmit fraction is the minimum of one and a first value, the first value being a maximum of a fifth constant and a second value, the second value being a previous global transmit fraction plus a third value, the third value being a fourth value multiplied by a fifth value, the fourth value being a sixth constant multiplied by a previous multiplier multiplied by a global offered rate multiplied by a time interval divided by a maximum queue level, the fifth value being a seventh constant minus an eighth constant multiplied by the previous multiplier multiplied by the queue level divided by the maximum queue level, the multiplier being an exponentially weighted average which approaches a first level if a previous queue level is below a threshold and which approaches a second level if the previous queue level is above the threshold.

9. The method of claim 1 wherein each of the plurality of pipes includes at least one type of service and wherein the utilizing step (g) further includes the step of:
(g1) utilizing the scheduler to schedule traffic from the queue for each of the plurality of pipes based on the at least one type of service.

10. The method of claim 9 wherein the at least one type of service is a particular type of service of each flow of the plurality of flows in each of the plurality of pipes and were step (g1) further includes the step of:
(g1i) utilizing the scheduler to scheduler traffic from the queue for each of the plurality of flows based on the particular type of service for each of the plurality of flows.

11. The method of claim 1 wherein the scheduler includes at least one calendar.

12. The method of claim 1 wherein the scheduler includes at least one weighted fair queuing ring.

13. The method of claim 1 wherein the scheduler includes at least one calendar and at least one weighted fair queuing ring.

14. The method of claim 1 wherein the scheduler includes at least one calendar and at least one first in first out mechanism.

15. A computer-readable medium including a program for controlling a plurality of pipes in a computer network including at least one processor for a switch, the at least one processor having a queue, the plurality of pipes utilizing the queue for transmitting traffic through the switch, the program including instructions for:
(a) allowing a minimum flow and a maximum flow to be set for each of the plurality of pipes;
(b) determining if excess bandwidth exists for the queue;
(c) determining a queue level for the queue;
(d) determining an offered rate of the plurality of packets to the queue;
(e) controlling a global transmit fraction of the plurality of packets to the queue, based on the queue level and the offered rate, so that the global transmit fraction and the queue level are critically damped if the queue level is between at least a first queue level and a second queue level;
(f) setting a transmit fraction for a flow for a pipe of the plurality of pipes to be a minimum of the global transmit fraction and a differential transmit fraction, the differential transmit fraction capable of linearly increasing the flow based on the minimum flow or the maximum flow if excess bandwidth exists and if the flow for the pipe of the plurality of pipes is less than the maximum flow for the pipe and capable of exponentially decreasing the flow for the pipe of the plurality of pipes based on the minimum flow or the maximum flow if excess bandwidth does not exist and the flow is greater than the minimum flow for the pipe, such that the traffic through the queue is stable;
(g) controlling transmission of traffic to the queue based on the transmit fraction; and
(h) utilizing a scheduler to control traffic from the queue.

16. The computer-readable medium of claim 15 wherein each of the plurality of pipes includes at least one type of service and wherein the utilizing instructions (g) further includes instructions for:
(g1) utilizing the scheduler to schedule traffic from the queue for each of the plurality of pipes based on the at least one type of service.

17. The computer-readable medium of claim 16 wherein the at least one type of service is a particular type of service of each flow of the plurality of flows in each of the plurality of pipes and were instructions (g1) further includes instructions for:
(g1) utilizing the scheduler to schedule traffic from the queue for each of the plurality of flows based on the particular type of service for each of the plurality of flows.

18. The computer-readable medium of claim 15 wherein the scheduler includes at least one calendar and at least one weighted fair queuing ring.

19. A system for controlling a plurality of pipes in a computer network including at least one processor for a switch, the at least one processor having a queue, the plurality of pipes utilizing the queue for transmitting traffic through the switch, the system comprising:

a queue for use by the plurality of pipes in transmitting traffic through the switch;

an enqueuing mechanism, coupled with the queue, for controlling traffic through the switch using a minimum flow and a maximum flow set for each of the plurality of pipes by a user, the enqueuing mechanism for determining if excess bandwidth exists for the queue, for determining a queue level for the queue, and for determining an offered rate of the plurality of packets to the queue, the enqueuing mechanism also controlling a global transmit fraction of the plurality of packets to the queue, based on the queue level and the offered rate, so that the global transmit fraction and the queue level are critically damped if the queue level is between at least a first queue level and a second queue level, the enqueuing mechanism also for setting a transmit fraction for a flow for a pipe of the plurality of pipes to be a minimum of the global transmit fraction and a differential transmit fraction, the differential transmit fraction capable of linearly increasing the flow based on the minimum flow or the maximum flow if excess bandwidth exists and if the flow for the pipe of the plurality of pipes is less than the maximum flow for the pipe and capable of exponentially decreasing the flow for the pipe of the plurality of pipes based on the minimum flow or the maximum flow if excess bandwidth does not exist and the flow is greater than the minimum flow for the pipe, such that the traffic through the queue is stable, the enqueuing mechanism also for controlling transmission of traffic to the queue based on the transmit fraction; and a scheduler to control traffic from the queue.

20. The system of claim 19 wherein each of the plurality of pipes includes at least one type of service and wherein the scheduler further schedules traffic from the queue for each of the plurality of pipes based on the at least one type of service.

21. The system of claim 20 wherein the at least one type of service is a particular type of service of each flow of the plurality of flows in each of the plurality of pipes and wherein the scheduler schedules traffic from the queue for each of the plurality of flows based on the particular type of service for each of the plurality of flows.

22. The system of claim 19 wherein the scheduler includes at least one calendar.

23. The system of claim 19 wherein the scheduler includes at least one weighted fair queuing ring.

24. The system of claim 19 wherein the scheduler includes at least one calendar and at least one weighted fair queuing ring.

25. The system of claim 19 wherein the scheduler includes at least one calendar and at least one first in first out mechanism.

26. A processor for use with a switch in a computer network, the processor being coupled to a plurality of ports and a switch fabric, the processor for controlling a plurality of pipes for the switch fabric, the processor comprising:

a queue for use by the plurality of pipes in transmitting traffic through the switch;

an enqueuing mechanism, coupled with the queue, for controlling traffic through the switch using a minimum flow and a maximum flow set for each of the plurality of pipes by a user, the enqueuing mechanism for determining if excess bandwidth exists for the queue, for determining a queue level for the queue, and for determining an offered rate of the plurality of packets to the queue, the enqueuing mechanism also controlling a global transmit fraction of the plurality of packets to the queue, based on the queue level and the offered rate, so that the global transmit fraction and the queue level are critically damped if the queue level is between at least a first queue level and a second queue level, the enqueuing mechanism also for setting a transmit fraction for a flow for a pipe of the plurality of pipes to be a minimum of the global transmit fraction and a differential transmit fraction, the differential transmit fraction capable of linearly increasing the flow based on the minimum flow or the maximum flow if excess bandwidth exists and if the flow for the pipe of the plurality of pipes is less than the maximum flow for the pipe and capable of exponentially decreasing the flow for the pipe of the plurality of pipes based on the minimum flow or the maximum flow if excess bandwidth does not exist and the flow is greater than the minimum flow for the pipe, such that the traffic through the queue is stable, the enqueuing mechanism also for controlling transmission of traffic to the queue based on the transmit fraction; and a scheduler to control traffic from the queue.

27. A switch for use in a computer network including a plurality of hosts, the switch comprising:

a plurality of processors, each of the plurality of processors coupled with a plurality of ports, the plurality of ports coupled with a portion of the plurality of hosts, each of the plurality of processors including a queue, an enqueuing mechanism and a scheduler, the queue accepting traffic from a plurality of pipes in a computer network, the plurality of pipes coupling a portion of the plurality of ports coupled with a first processor and a portion of the plurality of ports coupled with a second processor, the enqueuing mechanism being coupled with the queue, for controlling traffic through the switch using a minimum flow and a maximum flow set for each of the plurality of pipes by a user, the enqueuing mechanism for determining if excess bandwidth exists for the queue, for determining a queue level for the queue, and for determining an offered rate of the plurality of packets to the queue, the enqueuing mechanism also controlling a global transmit fraction of the plurality of packets to the queue, based on the queue level and the offered rate, so that the global transmit fraction and the queue level are critically damped if the queue level is between at least a first queue level and a second queue level, the enqueuing mechanism also for setting a transmit fraction for a flow for a pipe of the plurality of pipes to be a minimum of the global transmit fraction and a differential transmit fraction, the differential transmit fraction capable of linearly increasing the flow based on the minimum flow or the maximum flow if excess bandwidth exists and if the flow for the pipe of the plurality of pipes is less than the maximum flow for the pipe and capable of exponentially decreasing the flow for the pipe of the plurality of pipes based on the minimum flow or the maximum flow if excess bandwidth does not exist and the flow is greater than the minimum flow for the pipe, such that the traffic through the queue is stable, the enqueuing mechanism also for controlling transmission of traffic to the queue based on the transmit fraction, the scheduler for controlling traffic from the queue; and a switch fabric coupling the plurality of processors.

28. The switch of claim 27 wherein each of the plurality of processors corresponds to a blade of a plurality of blades.

* * * * *